United States Patent [19]
Gaidos et al.

[11] Patent Number: 5,499,198
[45] Date of Patent: Mar. 12, 1996

[54] METHOD FOR PREDICTING SPRAY DRIFT

[75] Inventors: Robert E. Gaidos; Mukund R. Patel, both of Midland, Mich.

[73] Assignee: The Dow Chemical Company, Midland, Mich.

[21] Appl. No.: 114,524

[22] Filed: Aug. 31, 1993

[51] Int. Cl.$^6$ ....................................... B05D 1/02
[52] U.S. Cl. .................... 364/555; 73/61.62; 427/421
[58] Field of Search .................................. 364/524, 550, 364/551.01, 555; 73/23.21, 61.62; 427/9, 10, 421

[56] References Cited

U.S. PATENT DOCUMENTS

| | | | |
|---|---|---|---|
| 4,999,048 | 3/1991 | Freepons | 71/118 |
| 5,278,423 | 1/1994 | Wangler et al. | 250/561 |
| 5,279,151 | 1/1994 | Coody et al. | 73/86 |

*Primary Examiner*—Emanuel T. Voeltz
*Assistant Examiner*—Edward Pipala

[57] ABSTRACT

A method for predicting, and thus reducing, liquid or solid pesticide drift when sprayed onto targets. This method is especially applicable to fixed-wing (low release height) and rotary-wing (high release height) applications.

7 Claims, 17 Drawing Sheets

```
┌─────────────────┐      ┌──────────────────────┐
│  SPRAY DROPLET  │      │     FORMULATION      │
│      SIZE       │      │ PHYSICAL PROPERTIES  │
│  DISTRIBUTION   │      └──────────────────────┘
│   MEASURMENT    │      ┌──────────────────────┐
└─────────────────┘      │     APPLICATION      │
                         │      CONDITIONS      │
┌─────────────────────┐  └──────────────────────┘
│  CHARACTERIZATION   │  ┌──────────────────────┐
│  OF SPRAY DROPLET   │  │    METEOROLOGICAL    │
│  SIZE DISTRIBUTION  │  │      CONDITIONS      │
│     MEASUREMENT     │  └──────────────────────┘
└─────────────────────┘
              │    │   │   │
              ▼    ▼   ▼   ▼
            ┌─────────────────┐
            │     METHOD      │
            └─────────────────┘
              │              │
              ▼              ▼
     ┌──────────────┐  ┌──────────────┐
     │  ON-TARGET   │  │  OFF-TARGET  │
     │    SPRAY     │  │ SPRAY DRIFT  │
     │  DEPOSITION  │  │  DEPOSITION  │
     └──────────────┘  └──────────────┘
              │              │
              ▼              ▼
            ┌─────────────────┐
            │   RECOMMENDED   │
            │ SPRAY BARRIERS  │
            └─────────────────┘
                     │
                     ▼
            ┌─────────────────┐
            │   FORMULATION   │
            │  OPTIMIZATION   │
            └─────────────────┘
```

Fig. 21

METHOD FOR PREDICTING SPRAY DRIFT

BACKGROUND OF THE INVENTION

This application relates to a method for predicting, and thus reducing, pesticide spray drift resulting from aerial and ground applications onto a target. This method is especially applicable to fixed-wing and rotary-wing applications.

Pesticide drift is principally caused by airborne movement of spray droplets or particles, produced when pesticides in the form of liquid or solid formulations are sprayed over an area of application. Such an operation normally produces a wide range of droplet sizes including very small droplets which may travel in the wind direction over substantial distances, causing off-target deposition of pesticides.

In the United States hundreds of millions of acres receive pesticide application each year. Aerial applications, mainly by fixed wing and rotary wing aircraft are used over much of this area. The extent of the problem caused by pesticide drift may be illustrated by damage claims reported by the insurance industry. For example, between June 1979 and July 1980, claims for crop damages caused by spray drift totaled U.S. $130,000,000, or about 43 cents for every acre that was sprayed. Statistics of this kind do not include environmental damage caused by the uncontrolled spread of pesticides.

When pesticide formulations are aerially applied to an application area, droplets are formed from normal atomization and/or by wind shear during the release of the spray through the air at 50 to 150 mph. The smaller droplets, typically less than 200 microns in initial diameter, may travel over large distances, thus causing off-target deposition of pesticides.

Also, as the droplets, which consist of the active ingredient(s), diluent and carrier, fall toward the target, the evaporation of the carrier, usually water, reduces the size of the droplets. With evaporation the smallest droplets may shrink to a size composed mainly of the active ingredient and a small portion of the diluent. These droplets have a size range of a few microns and may remain airborne. This effect of evaporation of the carrier from the spray formulation, is common to all pesticides applied in the form of solutions.

It is estimated that, due to drift, a significant amount, of the sprayed material never reaches the ground in the intended area of application when applied by an aircraft flying typically at a height of 6–8 feet above the ground and that this loss increases with an increased application height.

Different factors, such as meteorological conditions, spray equipment, type of aircraft, physical properties of the pesticide formulation, operator skill, et cetera, may influence spray drift. Typically, the risk of drift is increased in aerial spraying when high pressure, small, nozzle tips are used in the spraying equipment.

Finally, the Federal Insecticide, Fungicide, and Rodenticide Act (FIFRA) requires that droplet size distribution tests and field studies be conducted for each pesticide formulation and application hardware. Field studies have been routinely conducted to measure the on-target deposition and off-target spray drift deposition of pesticide formulations resulting from fixed-wing and rotary-wing applications. Spray drift studies cover a limited range of application and atmospheric conditions and additional spray drift studies must be conducted to meet FIFRA requirements for each new pesticide formulation and/or application system. This approach to quantify spray drift deposition is prohibitive because of the cost per study and time required. The cost to conduct spray drift field studies could total in excess of $150,000 for each formulation use pattern.

An alternative approach is to employ a mathematical model, validated from a subset of well designed field studies, for the establishment of standards for proper aerial spraying. These field studies should cover a range of application systems and meteorological conditions. A model would significantly reduce the number of field studies by providing the capability to predict spray deposition for a variety of application conditions given only the spray droplet size distribution and spray cloud dimensions. Hence, a model would assist in product registration efforts (by determination of recommended spray buffer distances). Additionally, a model could also be used during product development to tailor pesticide formulations that improve efficacy and minimize spray drift.

BRIEF DESCRIPTION OF PRIOR ART PRACTICES

Several prior models are currently available. Of these, AGDISP (M. E. Teske, "User Manual Extension for the Computer Code AGDISP MOD 4.0," prepared for USDA Forest Service by Continuum Dynamics, Inc., under subcontract 85–003, 1986.), FSCBG (R. K. Dumbauld, J. R. Bjorklund and S. F. Saterlie, "Computer Models for Predicting Aircraft Spray Dispersion and Deposition Above and Within Forest Canopies: User's Manual for the FSCBG Computer Program" prepared for USDA Forest Service by H. E. Cramer Company, Inc., Report Number 80-11, 1980.) and PKBW (J. J. C. Picot, B. Chitranged and N. Basak-Brown, "Canopy Deposit and Off-Target Drift in Forestry Aerial Spraying: The Effects of Operational Parameters" Transactions of the ASAE, 29, 90–96, 1981 ) have been extensively reviewed ((R. G. Huget and C. P. Bourque, "Pesticide Aerial Drift Modeling", prepared by Concord Scientific Corporation, 1987.) and (D. W. Hopper, "Predictive Modeling of Aerial Pesticide Spray Drift and Deposition, Phase I" prepared by Senes Consultants Limited, 1984.))

These models were not developed with the primary aim of predicting spray drift deposition and incorporate detailed descriptions of aircraft dynamics which are usually overshadowed by the variability in the normal experimental and application conditions. Predictions by the AGDISP and FSCBG when compared with spray drift deposition data are generally poor as can be seen in the following reports. ((J. E. Rafferty and J. F. Bowers, "Comparison of FSCBG2 and FSCBG3 Aerial Spray Model Predictions with Field Measurements", USDA Forest Service Report FPM 90-2, 1990.), (A. J. Bilanin, M. E. Teske, J. W. Barry and R. B. Ekblad, "AGDISP: The Aircraft Spray Dispersion Model, Code Development and Experimental Validation", Transactions of the ASAE, 32, 327–334, 1989.))

Since the above models do not predict spray drift deposition very well, particularly for low release heights and are complex, slow executing and computationally expensive, the present invention, a method for prediction of spray deposition from an aerial application, was developed. This invention has been validated from actual spray field studies for both fixed wing (agricultural—low release height) and rotary wing (right-of-way—high release height) applications.

Results from the present invention are provided in both graphical and tabular form. A typical spray drift prediction run using 100 droplet sizes to represent an initial discrete spray droplet distribution requires approximately 5 minutes on an IBM PS/2 Model 70 (Trademarks of IBM Corporation) personal computer.

The method of the present invention would assist in product registration efforts (determination of recommended spray buffer distances). This method would also provide information for training field sales personnel and technical specialists serving the pesticide market. Additionally, this method could be used during product development to tailor pesticide formulations to improve efficacy and minimize spray drift.

SUMMARY OF THE INVENTION

The present invention is a method for predicting on-target and off-target spray deposition from aerial applications by providing an initial discrete spray droplet size distribution data for the applied spray formulation containing an active ingredient, application condition data, prevailing meteorological condition data, the volume fraction data of the non-volatile components of the formulation. Then the method determines the formulation carrier property data, the fluid property data of the fluid through which the formulation carrier traverses, and the heights and widths of effective initial spray droplet volume sources which correspond to the discrete initial spray droplet sizes in the spray droplet distribution. The application condition data, prevailing meteorological condition data, the volume fraction data of the non-volatile components of the formulation. Then the method determines the formulation carrier property data, the fluid property data are then applied to each volume source to determine spray deposition resulting from each volume source. The spray deposition from each volume source is then combined to determine the total amount of spray deposited on-target as well as off-target.

BRIEF DESCRIPTION OF THE DRAWINGS

Figure 6:
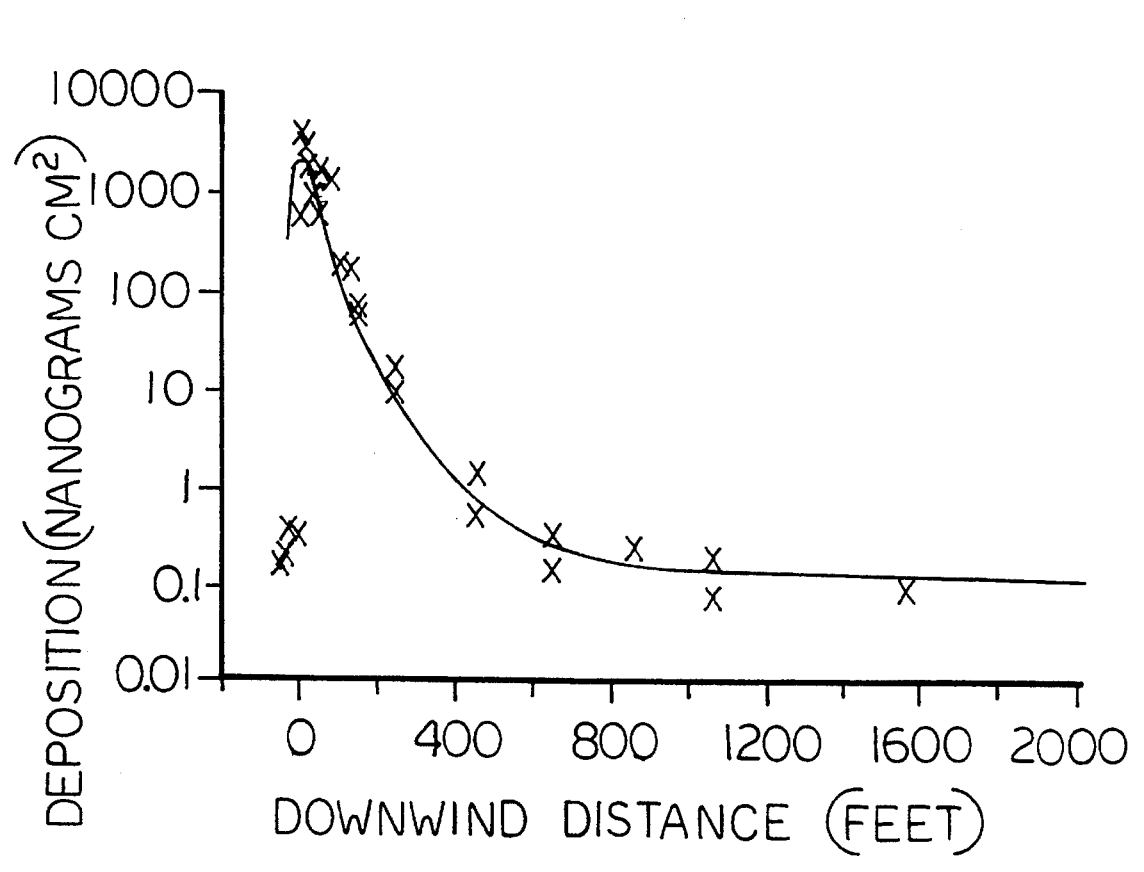

FIG. 3, 6, 9, 12, 13, 16 and 19 are graphical representations of deposition, using both field study data and prediction from the method of the present invention versus the downwind distance for a given treatment.

FIG. 20 schematic representation of a multiple swath pattern for aerial application of a pesticide.

FIG. 21 a simplified schematic of the inputs, outputs and potential uses of the method of the present invention.

DETAILED DESCRIPTION

Figure 1:
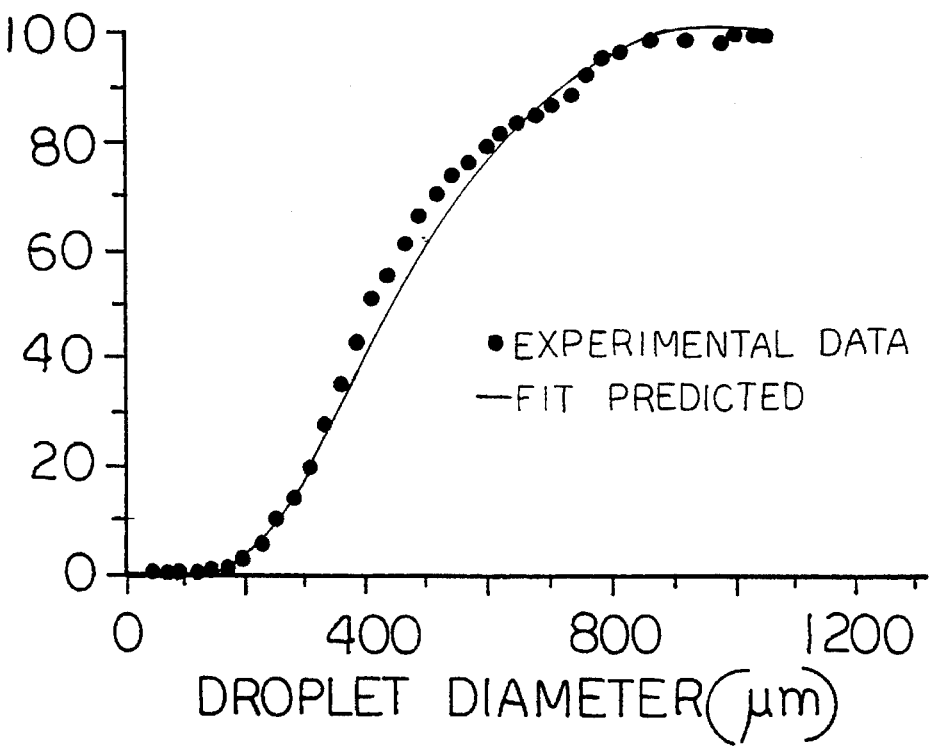
FIG. 1, 4, 7, 10, 14, and 17 are graphs of the cumulative volume versus droplet diameter using both experimental data and a mathematical representation of the experimental data for a given treatment.

The method of the present invention has the capability of predicting the amount of active material deposited on-target as well as off-target as a function of downwind distance for a range of meteorological and application conditions.

FIG. 21 is a simplified schematic of the present invention showing both inputs and outputs, as well as potential additional uses for the method.

In the method of the present invention the spray material flight line is represented by multiple volume sources. Each volume source contains an amount of active material corresponding to an initial size in the discrete spray droplet distribution. The position of each volume source is determined by the local wind speed and the settling velocity of the discrete droplet. The amount of active material which deposits is determined by the height of the volume source, the settling velocity of the discrete droplet, and amount of active material remaining in the volume source. The initial discrete drop size distribution is either entered directly in the form of actual known data or may be characterized by a distribution function.

The method inputs are the characteristic droplet size distribution of the applied spray formulation and hardware system, the effective initial spray droplet volume source dimensions of width and height, the application conditions, (application spray rate, concentration of active material, percent non-volatiles, specific gravity, release height and swath pattern) and prevailing meteorological conditions (temperature, pressure, wind speed and humidity).

The method of the present invention is applicable but not limited to generally level terrain.

For the purpose of discussion the present invention will be described using liquid pesticide formulations, however the method of the present invention would also be applicable to solid pesticide formulations as well.

Aerial application of pesticides provides an efficient way to selectively control vegetation and insect pests. The active material is either dissolved or suspended in a carrier and the formulation sprayed in a swath pattern to cover the target area. A portion of the spray will drift downwind and be deposited off-target.

Liquid pesticides formulations are applied via nozzle systems which produce a range of droplet sizes. The effective spray droplet size distribution is a function of the nozzle geometry and orientation, the local velocity field around the aircraft and the rate of spray throughput. The droplet size distribution affects the uniformity of spray coverage, pesticide efficacy and amount of spray drift.

Spray drift deposition is highly sensitive to the initial spray droplet size distribution and the use of sparse, summarized data and/or an inappropriate distribution function can lead to incorrect predictions. The method of the present invention uses a complete spray droplet distribution as opposed to some other methods which may typically use only a small number, such as a maximum of sixteen size classes.

The first step of the method of the present invention is to obtain a spray droplet size distribution.

The spray droplet size distribution may be obtained in several different ways. One way would be to collect actual experimental spray droplet size distributions (for example using a laser-imaging spray droplet spectrometer, photographic image analysis, phase doppler particle analyzers or any other applicable technique). An additional manner of determining spray droplet size distribution, rather than actual testing, could be by utilizing the spray equipment in a wind tunnel. In yet another manner, spray droplet size distribution may also be predicted for a given spraying hardware configuration from the physical properties of the spray formulation.

For the purposes of discussion and examples of the method of the present invention, the manner used to obtain the spray droplet size distribution is not important, as long as that manner is adequate and reproducible, rather it is a requirement of the present invention that one have the spray droplet size distribution.

The spray droplet size distribution data may be provided to the method of the present invention either as: 1) actual experimentally obtained spray droplet size distributions; or 2) a mathematical representation of the spray droplet distribution, such as, for example, a four parameter Bounded Log-Normal (BLN) distribution function which is a modification of a function described in "Droplet Size Distribution in Sprays," Industrial & Engineering Chemistry, 43, 1317–1324, 1951, by R. A. Mugele and H. D. Evans.

The use of BLN distribution function for spray deposition has several advantages. The distribution function has both a minimum spray droplet diameter and a maximum spray droplet diameter. Additionally, the BLN distribution function can characterize distributions skewed to either smaller or larger diameters. This enables proper emphasis on the small droplet portion of the spray distribution which dominates far field deposition.

The cumulative volume distribution for the BLN distribution function is given by $$V = \frac{1}{2}[1 + erf(\delta y)] \quad (1)$$

with $$y = \ln\left[ A(2^s - 1) \frac{(D_p^s - D_{p\,min}^s)}{(D_{p\,max}^s - D_p^s)} \right] \quad (2)$$

where

Dp=Diameter of spray droplet
V=cumulative volume
$D_{pmin}$p=minimum spray droplet diameter
$D_{pmax}$=maximum spray droplet diameter
A=skewness parameter
δ=spread parameter
s=power and err represents the error function ("Handbook of Mathematical Functions", Dover, New York 297–299, 1965 M. Abramowitz and I. Stegun, editors).

The power s is typically either 1, 2, or 3 depending on the mechanism of distribution formation ("Droplet Size Distribution in Sprays," Industrial & Engineering Chemistry, 43, 1317–1324, 1951, by R. A. Mugele and H. D. Evans). A value of unity is used for the power in the method of the present invention.

The BLN distribution density, obtained by differentiation of Equation (1) with respect to the droplet diameter, is $$\frac{dV}{dD_p} = \frac{\delta}{\sqrt{n}} \frac{SD_p^{s-1}(D_{p\,max}^s - D_{p\,min}^s)}{(D_p^s - D_{p\,min}^s)(D_{p\,max}^s - D_p^s)} e^{-\delta^2 y^2} \quad (3)$$

The volume median diameter for the Bounded Log-Normal distribution function is $$D_{pV0.5} = \left[ \frac{D_{p\,max}^s + AD_{p\,min}^s}{1 + A} \right]^{1/s} \quad (4)$$

Additional distribution statistics (relative span, volume and Sauter mean diameters) can be obtained through BLN analysis.

In the method of this invention, the initial spray droplet size distribution is approximated by a discretized distribution of n droplet sizes as $$D_p(1) < \ldots < D_p(i-1) < D_p(i) < D_p(i+1) < \ldots < D_p(n) \quad (5)$$

The diameters of the spray droplets in the discrete spectrum are calculated using the formula $$D_p(i) = \sqrt{D_{p-}(i) \cdot D_{p+}(i)} \quad (6)$$

where $$D_{p-}(i) = \quad (7)$$

$$D_{p\,lower\,limit} + (D_{p\,upper\,limit} - D_{p\,lower\,limit}) \cdot \left(\frac{i-1}{n}\right)^m$$

$$D_{p+}(i) = D_{p\,lower\,limit} + (D_{p\,upper\,limit} - D_{p\,lower\,limit}) \cdot \left(\frac{i}{n}\right)^m \quad (8)$$

and $$D_{p\,lower\,limit} = \max(D_{p\,min}, D_{p\,critical}) \quad (9)$$

$$D_{p\,upper\,limit} = D_{p\,max} \quad (10)$$

The critical droplet diameter, $D_{p\,critical}$, is a specified size at which spray droplets are considered to completely evaporate into the surrounding air (never deposit).

The parameter m determines the droplet discretization pattern. For m=1, a linear discrete droplet size distribution pattern is obtained. The discrete droplet diameters are equally spaced between $D_{p\,lower\,limit}$ and $D_{p\,upper\,limit}$. For m>1, a non-linear droplet size distribution pattern is obtained. The discrete droplet diameters are skewed towards $D_{p\,lower\,limit}$.

High resolution of the initial spray droplet size distribution in the range of the sizes responsible for the near field deposition is not important to obtain accurate deposition predictions. High resolution of the initial spray droplet size distribution in the range of the sizes responsible for the far field deposition is necessary to obtain accurate spray drift deposition predictions. However, depending on the meteorological and application conditions (humidity and release height) and pesticide formulation (percent non-volatiles) there will be a droplet diameter below which all the discrete droplet diameters do not deposit. None of these discrete droplet sizes will affect the accuracy of the spray drift predictions.

Spray drift deposition is highly sensitive to the droplet size distribution and the use of an inappropriate discretization pattern may lead to inaccurate predictions. Both the parameters m and n will affect the number of discrete sizes in a given spray droplet range. Values of m=2 and n=100 are recommended for agricultural—low release height applications and values of m=2 and n=300 are recommended for right-of-way—high release height applications. The calculation time for the method is proportional to the number of initial discrete spray droplet sizes selected to represent the distribution.

The method of this invention includes evaporation of the spray droplets and has the capability of predicting the amount of active material deposited on-target as well as off-target for both fixed-wing (low release height) and rotary-wing (high release height) applications. In pesticide applications the active material is sprayed in a swath pattern to cover the target area schematically represented in FIG. 20.

The nomenclature used to describe the swath pattern is $X_S$=swath width
$Y_S$=swath length
$Z_S$=swath height
$D_S$=swath displacement
$Z_R$=spray release height
$N_S$=number of swaths The equations of motion, describing the two-dimensional trajectory of each evaporating (variable mass) spray droplet in the discrete spectrum (Equation (5)), are $$\frac{dx}{dt} = u_x \quad (11)$$

$$\frac{dz}{dt} = u_z \quad (12)$$

$$m_p \frac{du_x}{dt} + u_x \frac{dm_p}{dt} - v_x \frac{dm_p}{dt} = F_x \quad (13)$$

$$m_p \frac{du_z}{dt} + u_x \frac{dm_p}{dt} - v_z \frac{dm_p}{dt} = F_z \quad (14)$$

$$m_p = \rho_p V_p \quad (15)$$

where
- $m_p$ = mass of spray droplet
- $\rho_p$ = density of droplet
- $V_p$ = volume of droplet
- $x, z$ = Cartesian coordinates
- $U_{x,z}$ = velocity of droplet in the x or z direction
- $U_{x,z}$ = velocity of mass entering or leaving the droplet in the x or z direction
- $F_{x,z}$ = external force on droplet in the x or z direction The x and z coordinates represent the horizontal downwind and the vertical direction, respectively. If the velocity of the evaporated mass, at the instant of evaporation, is assumed to be equal to the velocity of the droplet, $v_x = u_x$ and $v_z = u_z$, then Equations (13) and (14) reduce to $$\rho_p V_p \frac{du_x}{dt} = F_x \quad (16)$$

$$\rho_p V_p \frac{du_z}{dt} = F_z \quad (17)$$

The external forces on the droplet are $$F_x = F_{dx} \quad (18)$$

and $$F_z = F_{dz} + F_b + F_g \quad (19)$$

where
- $F_{dx, dz}$ drag forces on the droplet in the x or z directions
- $F_b$ buoyance force on droplet
- $F_g$ gravitational force on droplet The drag forces in the x and z directions, respectively, are $$F_{dx} = -\rho_f \frac{C_d A_p}{2} (u_x - u_f) \cdot u_r \quad (20)$$

and $$F_{dx} = -\rho_f \frac{C_d A_p}{2} u_z \cdot u_r \quad (21)$$

with $$u_r = [(u_x - u_f)^2 + u_z^2]^{1/2} \quad (22)$$

where
- $\rho_f$ = density of fluid (air)
- $C_d$ = drag coefficient
- $A_p$ = cross-sectional area of droplet
- $U_r$ = velocity of the droplet relative to the fluid
- $U_f$ = average wind velocity The gravitational force and buoyance force, respectively, are $$F_g = \rho_p V_p g \quad (23)$$

$$F_b = \rho_f V_p g \quad (24)$$

where
- g = gravitational acceleration

Assuming that the spray droplets are spherical, the spray droplet cross-sectional area and volume may be replaced by $$A_p = \frac{\pi D_p^2}{4} \quad (25)$$

and $$V_p = \frac{\pi D_p^3}{6} \quad (26)$$

The drag coefficient is a function of the Reynolds number or flow regime and is given by $$C_d = \frac{24}{N_{Re}} + \frac{3.6}{N_{Re}^{0.313}} \quad 10^{-3} < N_{Re} < 10^3 \quad (27)$$

where the Reynolds number is $$N_{Re} = \frac{\rho_f D_p u_r}{\mu_f} \quad (28)$$

and
- $U_f$ = viscosity of fluid (air)

With suitable substitutions, the equations of motion describing the two dimensional motion of a variable mass droplet in a constant velocity air field become $$\frac{dx}{dt} = u_x \quad (29)$$

$$\frac{dz}{dt} = u_z \quad (30)$$

$$\rho_p V_p \frac{du_x}{dt} = -\frac{\rho_f C_d A_p}{2} (u_x - u_f) \cdot u_r \quad (31)$$

$$\rho_p V_p \frac{du_z}{dt} = (\rho_p - \rho_f) V_p g - \frac{\rho_f C_d A_p}{2} u_z \cdot u_r \quad (32)$$

The spray droplet diameter in Equations (25) and (26) is a function of time and an additional equation is required to describe the loss of mass from the droplet and change in droplet diameter with time due to evaporation. A semi-empirical correlation for the rate of mass transfer from a water droplet is given by $$N_{Sh} = 1.755 + 0.535 (N_{Re})^{1/2} (N_{Sc})^{1/3} \quad (33)$$

where the Sherwood and Schmidt numbers are defined as $$N_{Sh} = \frac{k_c D_p}{\rho_f D_v} = \frac{dm_p/dt}{D_v \pi D_p (C_o - C_f)} \quad (34)$$

$$N_{Sc} = \frac{\mu_f}{\rho_f D_v} \quad (35)$$

with
- $k_c$ = mass transfer coefficient
- $D_v$ = diffusion coefficient of carrier (water) in fluid (air)
- $C_o$ = water vapor concentration on droplet surface
- $C_f$ = water vapor concentration in surrounding fluid (air)

The above equations show that the rate of mass transfer (evaporation) is a function of the ambient conditions of temperature, pressure and humidity, the transport properties of water in air, the diameter, and relative velocity of the droplet. With the inclusion of the various terms defined above, the system of ordinary differential equations describing the motion of an evaporating spherical droplet may be written as $$\frac{dx}{dt} = u_x \tag{36}$$

$$\frac{dz}{dt} = u_z \tag{37}$$

$$\frac{du_x}{dt} = -\frac{3\rho_f C_d}{4\rho_p D_p}(u_x - u_f)[(u_x - u_f)^2 + u_z^2]^{1/2} \tag{38}$$

$$\frac{du_z}{dt} = (1-\rho_f/\rho_p)g - \frac{3\rho_f C_d}{4\rho_p D_p} u_z[(u_x - u_f)^2 + u_z^2]^{1/2} \tag{39}$$

$$\frac{dD_p}{dt} = -\frac{2D_v(C_o - C_f)}{D_p \rho_p}[1.755 + 0.535(N_{Re})^{1/2}(N_{Sc})^{1/3}] \tag{40}$$

In order to integrate these coupled system of equations, the concentration of the carrier (water) at the droplet surface, $C_o$, and in the ambient air, $C_f$, must be determined. The concentration at the droplet surface is a function of droplet surface temperature and is assumed to be the adiabatic saturation temperature.

For air-water systems, the wet-bulb and adiabatic saturation temperatures are equivalent, and the wet-bulb temperature can be calculated from a pseudo-steady-state energy balance on the droplet surface.

An energy balance around the evaporating droplet gives $$H_o - H = \frac{h_c}{\Delta H_v k_c}(T - T_o) \tag{41}$$

where $H_o$=absolute saturation humidity of carrier (water) at droplet surface

H=ambient absolute humidity of carrier (water)

$h_c$=heat transfer coefficient $\Delta H_v$=latent heat of vaporization of carrier (water)

$T_o$=temperature at droplet surface

T=ambient temperature

The absolute humidity is defined as $$H = \frac{p_v M_v}{(P - p_v)M_f} \tag{42}$$

where

P=ambient pressure $P_v$=partial pressure of carrier (water)

$M_v$=molecular weight of carrier (water)

$M_f$=molecular weight of fluid (vapor-free air)

The partial pressure is calculated from the relative humidity using $$p_v = \frac{p_v^* H_R}{100} \tag{43}$$

where $p^*_v$=vapor pressure of carrier (water)

$H_R$=relative humidity of carrier (water)

An equation analogous to Equation (33) for heat transfer, is given by $$N_{Nu} = 1.755 + 0.535(N_{Re})^{1/2}(N_{Pr})^{1/3} \tag{44}$$

where the Nusselt and Prandtl numbers are defined as $$N_{Nu} = \frac{k_c D_p}{k_f} \tag{45}$$

$$N_{Pr} = \frac{C_{pf}\mu_f}{k_f} \tag{46}$$

and $k_f$=thermal conductivity of fluid (air)

$C_{pf}$=heat capacity of fluid (air)

The ratio of transfer coefficients in Equation (41) is then calculated from $$\frac{h_c}{k_c} = \frac{k_f}{\rho_f D_v} \frac{1.755 + 0.535(N_{Re})^{1/2}(N_{Pr})^{1/3}}{1.755 + 0.535(N_{Re})^{1/2}(N_{Sc})^{1/3}} \tag{47}$$

The water vapor concentration on the spray droplet surface and in the ambient air are calculated using the ideal gas law as $$C_o = \frac{p_v M_v}{RT_o} \tag{48}$$

$$C_f = \frac{p_v M_v}{RT} \tag{49}$$

where

R=universal gas constant

Calculation of the droplet surface temperature is iterative since the absolute humidity and the latent heat of vaporization are both nonlinear functions of the droplet surface temperature.

The initial horizontal velocity of the droplets is assumed to be equal to the local air velocity. For small droplets, this is approximately the steady state solution of Equation (38). Large droplets remain air borne for a short period of time and the error introduced by this assumption is minor. Therefore, only Equations (37), (39) and (40) are integrated to determine the time required for each spray droplet size in the discrete spectrum to either deposit (fall a distance $Z_R$) or reach the droplet size limit ($D_{p\ critical}$). The initial vertical velocity of each spray droplet is assumed to be equal to the terminal velocity. The amount of time required to reach the terminal velocity is negligible for aerial applications and this assumption has little effect on the total time to deposit.

For droplets $D_p(i)$ greater than $D_{p\ core}(i)$ only the carrier evaporates (evaporation of the active material is considered negligible). Once all the carrier has evaporated, the droplet is considered to have a constant mass (diameter) and settling velocity. The core diameter for each discrete droplet size is calculated from the volume fraction of non-volatiles, as $$D_{p\ core}(i) = D_p(i)V_{fnv}^{1/3} \tag{50}$$

where $V_{fnv}$=volume fraction non-volatiles

The time required for the $i^{th}$ spray droplet to deposit ($z=Z_R$) is T(i). This approach assumes that the initial droplet temperature is near the wet-bulb temperature, that the active material in the emulsion phase does not alter the mass and heat transfer phenomena occurring at the droplet surface, the spray droplet density is constant, and that the vertical velocity is equal to the settling velocity.

The settling velocity may be determined by iteratively solving the following steady state variation Equation (39)

$$v_s = \left[\frac{4gD_p(\rho_p - \rho_f)}{3\rho_f C_d}\right] \tag{51}$$

The distance that the $i^{th}$ spray droplet in the discrete spectrum travels downwind, before deposition occurs, is then calculated from the average wind velocity using $$X(i) = T(i) \cdot u_f \tag{52}$$

Figure 20:
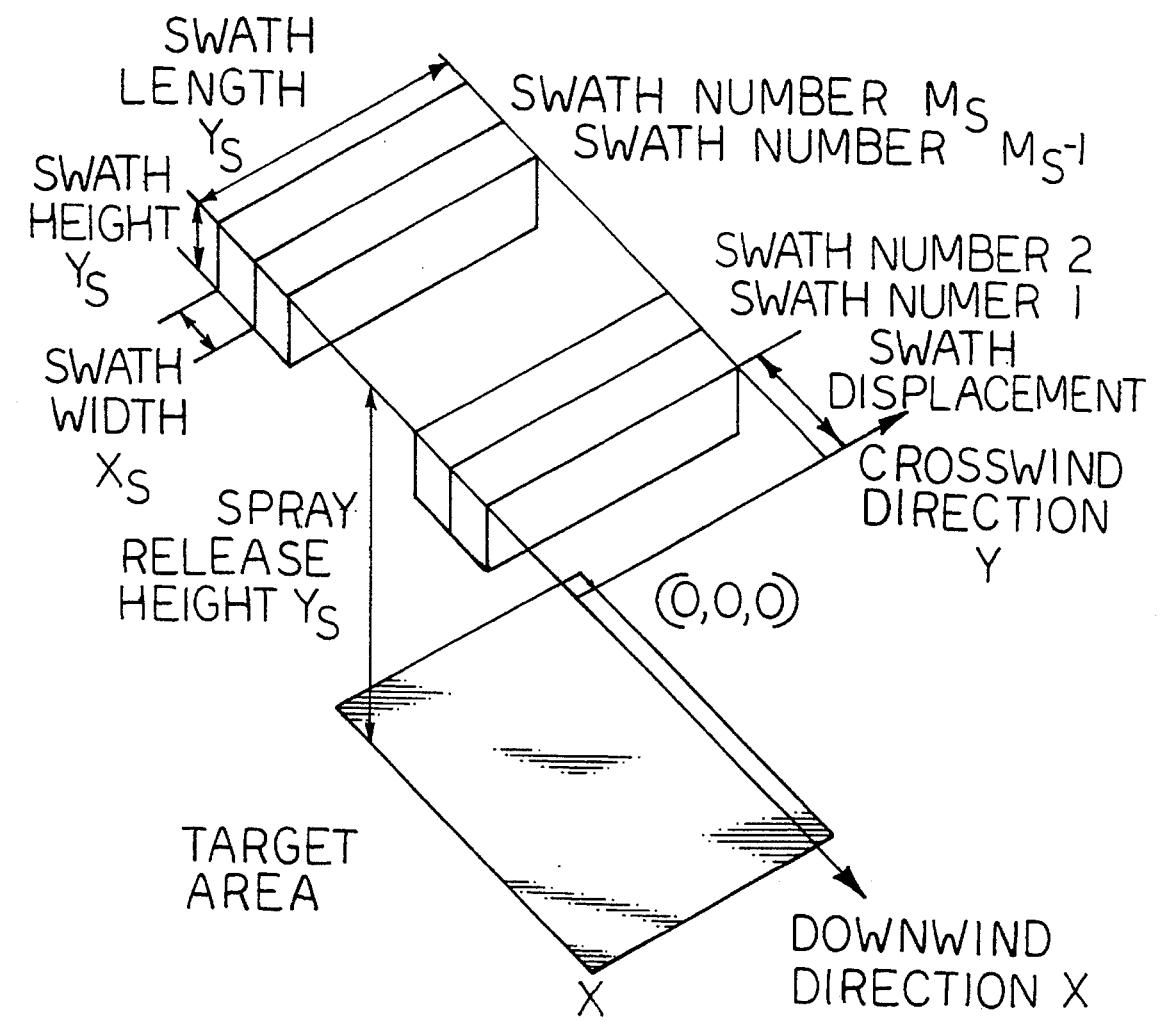

The swath pattern depicted in FIG. 20 is divided into one meter sections and the deposition calculated for a single one meter section (swath) located at $-1 \leq x \leq 0$ meters downwind. The initial mass of active material $A_o(i)$ associated with each diameter $D_p(i)$ is obtained by integrating Equation (3) over the discrete droplet diameter limits $D_{p-(i)}$ and $D_{p+(i)}$ $$A_o(i) = \frac{m_{am}}{N_S X_S} \int_{D_{p-}(i)}^{D_{p+}(i)} \frac{dV}{dD_p} dD_p \qquad (53)$$

where $m_{am}$=total amount of active material applied

Equation (53) can be expressed in a closed form via the error function as $$A_o(i) = \frac{m_{am}}{2N_S X_S} (erf[\delta_{y+}(i)] - erf[\delta_{y-}(i)]) \qquad (54)$$

The resulting deposition, D(i) for the $i^{th}$ spray droplet (refer to FIG. 3) is calculated using $$D(i) = \frac{2A_o(i)}{[X(i-1) - X(i+1)]Y_S} \qquad (55)$$

Figure 22:
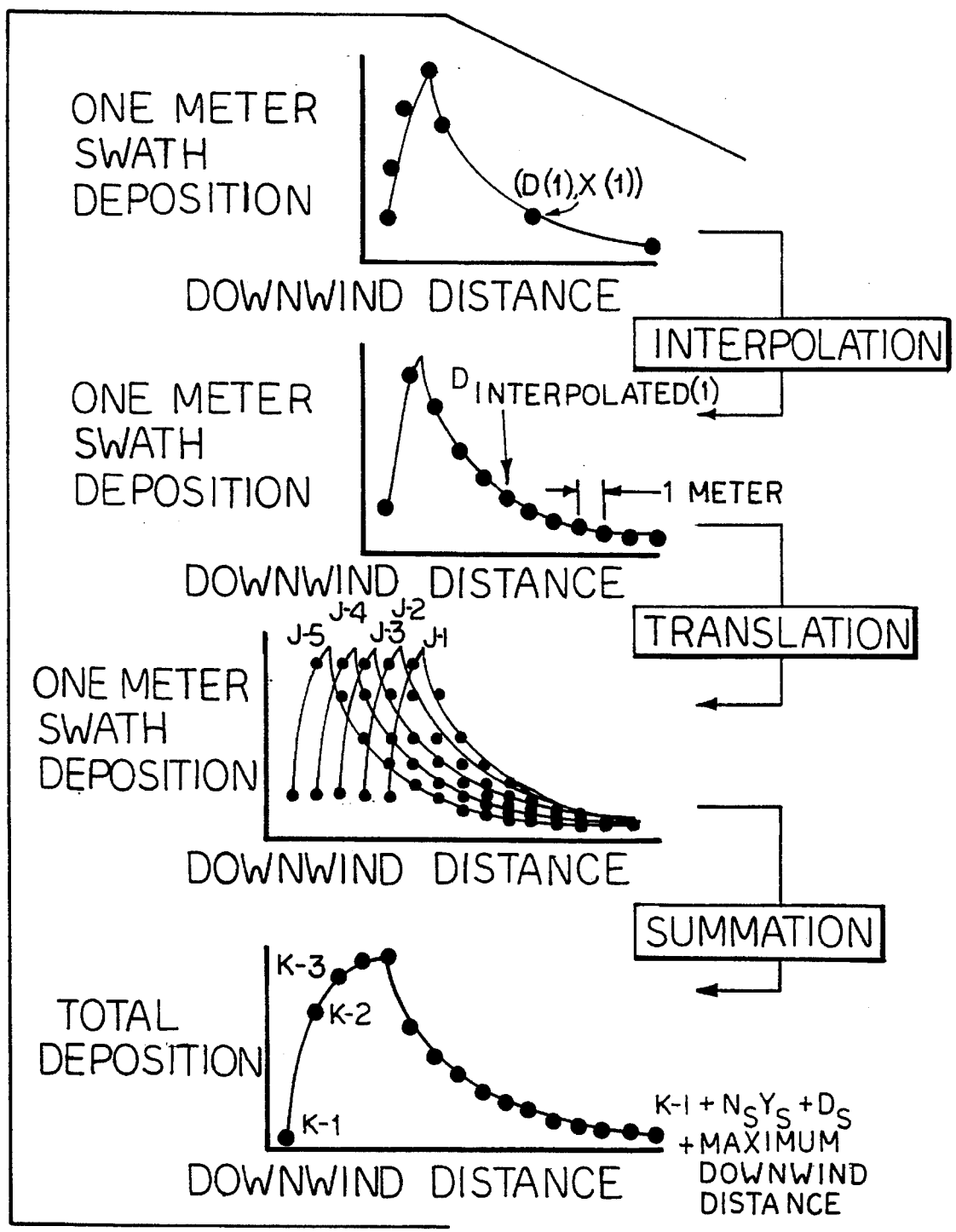
FIG. 22 is a graphical representation of the interpolation, translation and summation necessary to obtain a total deposition prediction.

The deposition for each successive $j^{th}$ one meter section upwind in the swath pattern will be equivalent to the deposition for the first one meter section translated j meters upwind. The total deposition can thus be calculated from the series D(i) by appropriate interpolation and translation of D(i) (taking into account the swath displacement) and summing over the number of one meter sections in the swath pattern (refer to FIG. 22). The series D(i) represents the deposition associated with the $i^{th}$ spray droplet at a downwind distance X(i) for a single one meter swath initially located $-1 \leq x \leq 0$ meters downwind. The series $D_{one-meter}(k)$ represents the deposition at a downwind distance of k meters for a single one meter swath initially located $-1 \leq x \leq 0$ meters downwind.

$$k = i - N_S X_S - D_S \quad i = 1,2,3 \ldots \qquad (56)$$

The series $D_{total}(k)$ represents the total deposition at a downwind distance of k meters and is calculated from the interpolated deposition.

$$A_{total}(k) = \sum_{j=1}^{\min(i, N_S X_S)} D_{one-meter}(i - j + 1) \qquad (57)$$

where k=downwind distance (meters)

$D_{one-meter}(k)$=interpolated deposition for one meter swath $D_{total}(k)$=total deposition at a downwind distance of k meters This interpolation/summation procedure could be done for any length having a value of unity. One meter was chosen to be a good compromise between accuracy and calculation time.

The stirred settling approach of the method of the present invention assumes that each discrete spray droplet is contained in a cloud (volume source) which is continually mixed by air currents. The volume source is assumed to move downwind at a rate equal to the average local wind speed. The amount of the active material which deposits is determined by the height of the volume source, the settling velocity of the droplets and the droplet distribution currently remaining in the volume source. The droplets in each volume source evaporate. The rate of change in the amount of active material contained in each volume source is given by $$\frac{dA(i)}{dt} = \begin{cases} -\frac{v_s(i)}{Z_S} A(i) & \text{if } Z(i) \geq Z_R - Z_S \\ 0 & \text{if } Z(i) < Z_R - Z_S \end{cases} \qquad (58)$$

Figure 23:
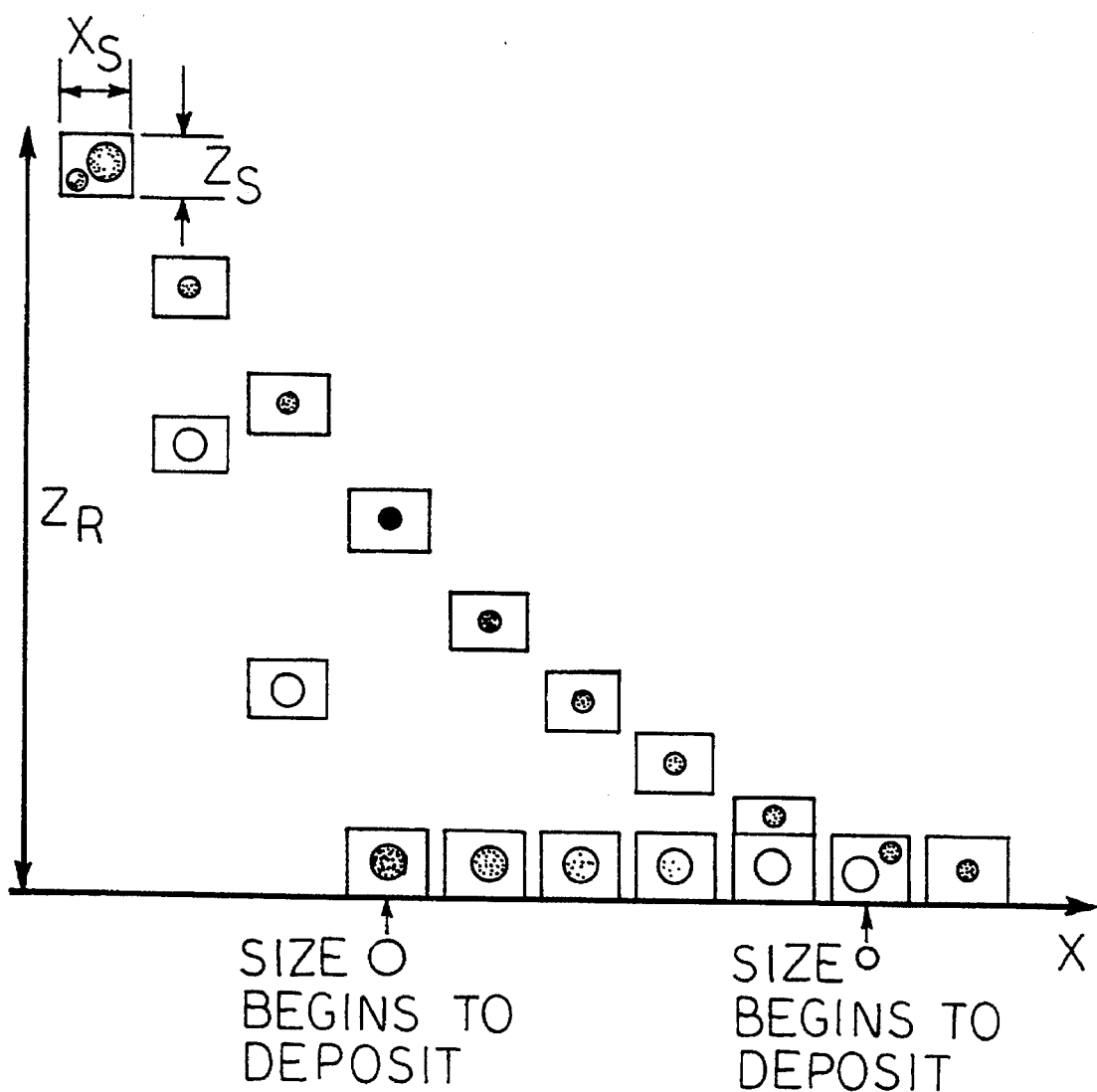
FIG. 23 is a graphical representation of spray droplet settling and deposition.

Deposition from each volume source does not begin until the volume source for that spray droplet reaches the ground (refer to FIG. 23). The initial height of each volume source is assumed to be equal to the spray release height minus the swath height ($Z_R - Z_S$). As each volume source moves downwind the height is determined from the settling velocity of the spray droplet using $$Z(i) = Z_R - Z_S - \sum_{t=0}^{t} v_s(i) \Delta t \qquad (59)$$

where

Z(i)= height of volume source for $i^{th}$ spray droplet

The height of the volume source $Z_S$ is assumed to be the same for each spray droplet. However, the initial dimension could be spray droplet size dependent. Additionally, the dimensions of each volume source could increase similar to a Gaussian plume expansion as the volume source moves downwind. This additional complexity would have a negligible effect on large droplets. The deposition of the smaller droplet would start earlier (the volume source would reach the ground earlier) and the rate of deposition would decrease. This model adjustment could be used to account for atmospheric stability.

When integrating Equation (58) the settling velocity for each discrete spray droplet size is considered constant over the period of integration $\Delta t = 1/u_f$ $$A_{t+\Delta t}(i) = A_t(i) e^{-v_s(i) \Delta t / Z_s} \qquad (60)$$

The period of integration is the time required for the volume source to travel one meter downwind (allows for easy translation). The initial amount of active material contained in each discrete spray droplet size is given by Equation (53). The spray droplet size after each time step is calculated by integrating Equation (40).

$$Dp_{t+\Delta t}(i) = \sqrt{Dp_t(i) - 4 \frac{D_v(C_o - C_f) N_{Sh}}{\rho_p} \Delta t} \qquad (61)$$

The updated spray droplet size is used to recalculate the settling velocity for the discrete spray droplet in each volume source for the next time step.

The deposition from each volume source for the time step is calculated using $$D(i) = A_{t+\Delta t}(i) - A_t(i) \qquad (62)$$

where

D(i)=deposition from $i^{th}$ volume source

The total deposition for the one meter volume source is the sum of the depositions from each volume source.

$$D_{one-meter}(k) = \sum_{i=1}^{n} D(i) = \sum_{i=1}^{n} [A_{t+\Delta t}(i) - A_t(i)] \qquad (63)$$

The total deposition can thus be calculated from the series D(xxx) by appropriate translation of $D_{one-meter}(k)$ (taking into account the swath displacement) and summing over the number of one meter sections in the swath pattern.

$$k = i - N_S X_S - D_S \quad i = 1,2,3 \ldots \qquad (64)$$

$$D_{total}(k) = \sum_{j}^{\min(i, N_S X_S)} D_{one-meter}(i - j + 1) \qquad (65)$$

A sensitivity analyses was performed using the stirred settling model to demonstrate the impact that variations of wind speed, humidity and droplet size distribution have on the predicted deposition.

The concentration of air borne active material may be calculated using $$C(h,k)=\frac{\sum_{i=1}^{n}A(i)}{Z_SY_S}\quad \text{if } Z(i)\leqq h\leqq Z(i)+Z_S \tag{66}$$

where h=height (meters)

C(h,k)=air borne concentration

The average concentration of air borne material for the one meter swath is $$C(k)=\frac{\sum_h C(h,k)}{h} \tag{67}$$

Each successive one meter swath will have the same concentration profile history but translated upwind.

Additional depletion of active material from each discrete volume source resulting from canopy impaction could be formulated as $$\frac{dA(i)}{dt}=-\frac{v_s}{Z_S}A(i)-\rho_{foliage}\epsilon A(i) \tag{68}$$

where $\rho_{foliage}$=foliage density $\epsilon$=collection efficiency

The collection efficiency would be a function of foliage type, spray droplet size, and atmospheric stability. The variation of foliage density with height could easily be included. The canopy impaction term could be turned on/off depending on position of each discrete volume source (bottom of canopy <Z(i)<top of canopy).

The variation of wind speed with height could be included in the model by adjusting the period of integration for each volume source $$\Delta t_i=\frac{1}{u_f(Z(i)+Z_S/2)} \tag{69}$$

where $u_f(Z(i)+Z_S/2)$= wind speed at the current average height of the volume source The effect of Brownian movement, thermal forces, electrical forces, centrifugal forces on deposition are not considered. The settling velocity and collection efficiency for minute droplets could be augmented to account for these additional effects.

The required fluid (air) and carrier (water) physical properties are estimated from pertinent correlations. For a carrier different from water appropriate correlations for the heat of vaporization, vapor pressure and diffusion coefficient are required. Non-aqueous, low-volatile oil based carriers may be simulated by setting the relative humidity equal to 100%.

The gas phase heat capacities are calculated as a function of ambient temperature using the following correlation $$C_p=\left[A+B\cdot\exp\left(-\frac{C}{T^D}\right)\right]\left(\frac{1000}{0.23901\cdot M}\right) \tag{70}$$

where $C_p$(J/kg.K)=heat capacity

T(K)=absolute temperature

M=molecular weight

The component correlation constants used in the above correlation are listed below.

| Compound | A | B | C | D | M |
|---|---|---|---|---|---|
| Air | 6.96980 | 2.33675 | 36254.6 | 1.53549 | 28.960 |
| Water | 7.99710 | 10.4064 | 1095.87 | 0.935888 | 18.015 |

The heat capacity of the fluid is calculated from the mole fractions and heat capacity of the components using the mixing rule $$C_{pf}=\frac{x_aM_a}{x_aM_a+x_wM_w}C_{pa}+\frac{x_wM_w}{x_aM_a+x_wM_w}C_{pw} \tag{71}$$

The mole fractions of water and air are calculated from the vapor pressure of water and the relative humidity using $$p_w=\frac{p_w^*\cdot RH}{100} \tag{72}$$

$$x_w=\frac{p_w}{P} \tag{73}$$

$$x_a=1-x_w \tag{74}$$

The fluid (air) density is calculated using the Ideal Gas Law $$\rho_f=\frac{P\cdot M_a}{0.082056\cdot T} \tag{75}$$

where

ρf(kg/ma)= fluid density

P(atm)= atmospheric pressure

T(K)= absolute temperature $M_a$=molecular weight of air

The component gas-phase thermal conductivities are calculated as a function of temperature using the following correlation $$k=\exp\left(A+\frac{B}{T+C}\right)\left(\frac{1054.185\cdot 1.8}{3600\cdot 0.3048}\right) \tag{76}$$

where k(J/m.s.K)=thermal conductivity

T(K)= absolute temperature

The component correlation constants used in the above correlation are listed below.

| Compound | A | B | C |
|---|---|---|---|
| Air | −2.23464 | −1468.80 | 448.713 |
| Water | −0.04770 | −5361.97 | 902.089 |

The thermal conductivity of the gas mixture is calculated from the mole fractions and thermal conductivities of the pure components using the mixing rule.

$$k_f=\frac{x_ak_a}{x_a+x_w\theta_{aw}}+\frac{x_wk_w}{x_w+x_a\theta_{wa}} \tag{77}$$

where $$\theta_{wa}=\frac{[1+(k_w/k_a)^{1/2}(M_w/M_a)^{1/4}]^2}{[8(1+M_w/M_a)]^{1/2}} \tag{78}$$

$$\theta_{aw}=\frac{[1+(k_a/k_w)^{1/2}(M_a/M_w)^{1/4}]^2}{[8(1+M_a/M_w)]^{1/2}} \tag{79}$$

The fluid (air) viscosity is calculated as a function of temperature using the following correlation $$\mu_f = \exp\left(A + \frac{B}{T+C}\right)\left(\frac{1}{1000}\right) \quad (80)$$

where $\mu_f$(kg/m.s)=viscosity

T(K)=absolute temperature

The constants for air used in the above correlation are listed below.

| Compound | A | B | C |
|---|---|---|---|
| Air | −3.35088 | −210.146 | 34.7610 |

The heat of vaporization of the carrier (water) is calculated based on the following correlation $$\Delta H_v = A\,(T_c - T)^B \left(\frac{1000}{0.23901 \cdot M}\right) \quad (81)$$

where $\Delta H_v$(J/kg)=latent heat of vaporization $T_c$(K)=critical temperature T(K)= absolute temperature The constants for water used in the above correlation are listed below.

| Compound | A | B | $T_c$ | M |
|---|---|---|---|---|
| Water | 1257.31 | 0.36454 | 647.3 | 18.015 |

The vapor pressure of the saturated liquid carrier (water) as a function of temperature is calculated using the following correlation $$\ln(p_v^*/p_c) = \quad (82)$$

$$\frac{(1-T_r)}{T_r}\,[A + B(1-T_r)^{1/2} + C(1-T_r)^2 + D(1-T_r)^5]$$

$$T_r = \frac{T}{T_c} \quad (83)$$

where $p^*_v$(mmH g)=vapor pressure $T_r$=reduced temperature $P_c$(mmH g)= critical pressure $T_c$(K)=critical temperature T(K)=absolute temperature The constants for water used in the above correlation are listed below.

| Compound | A | B | C | D | $T_c$ | $P_c$ |
|---|---|---|---|---|---|---|
| Water | −7.77352 | 1.47362 | −2.78684 | −1.23551 | 647.3 | 165911.2 |

The molecular diffusion coefficient of the carrier (water) in the fluid (air) is based on the following correlation $$D_v = A\,\frac{(T/B)^C}{P}\left(\frac{760}{1.01325 \cdot 10000}\right) \quad (84)$$

where $D_v$(m$^2$/s)=diffusion coefficient

T(K)=absolute temperature

P(mmH g)= pressure

The constants used in the above correlation are listed below.

| Compound | A | B | C |
|---|---|---|---|
| Water | 0.216 | 273.15 | 1.8 |

Method prediction results are presented for two example sets of field trial treatments. The first set is for fixed-wing, agricultural application and the second is for rotary-wing, right-of-way application. The spray droplet distributions for all example treatments (A–G) were characterized using the Bounded Log-Normal (BLN) distribution function.

EXAMPLE SET #1 (PREDICTED AND ACTUAL)

The agricultural treatments were triclopyr based herbicide formulations used to control broadleaf weeds and grass in rice. The field deposition studies were performed to determine the drift potential for triclopyr. Spray droplet distribution measurements for the above treatments were conducted for a D12–46 disc-core nozzle system using a laser-imaging spray droplet spectrometer technique.

Figure 2:
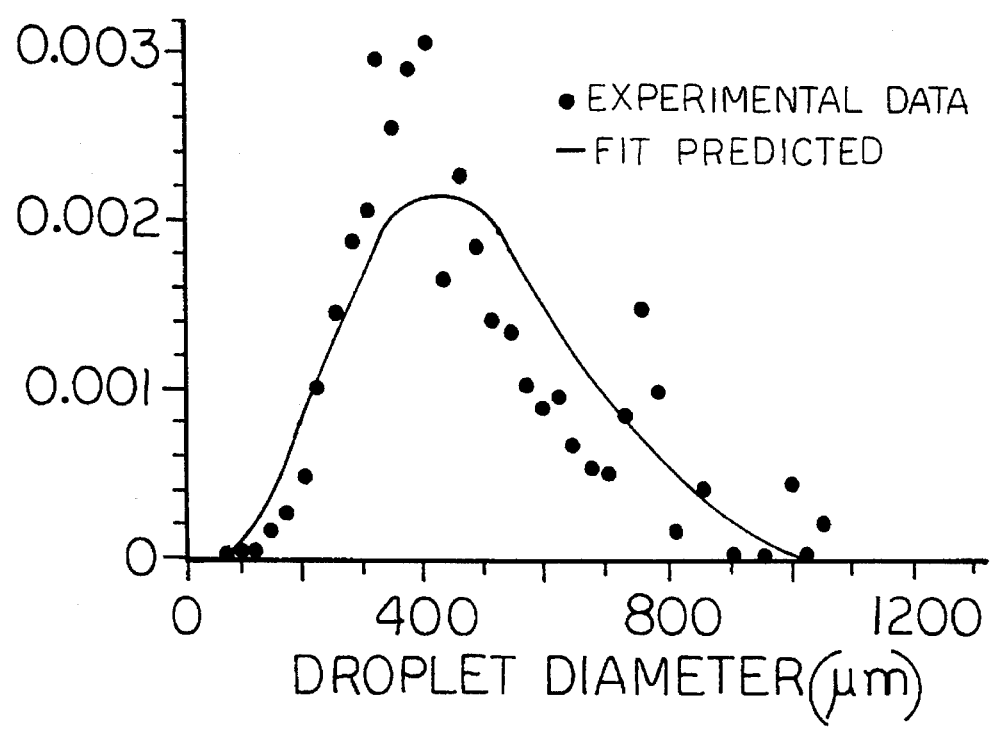
FIG. 2, 5, 8, 11, 15 and 18 are graphs of the distribution density versus droplet diameter using both experimental data and a mathematical representation of the experimental data for a given treatment.
Figure 3:
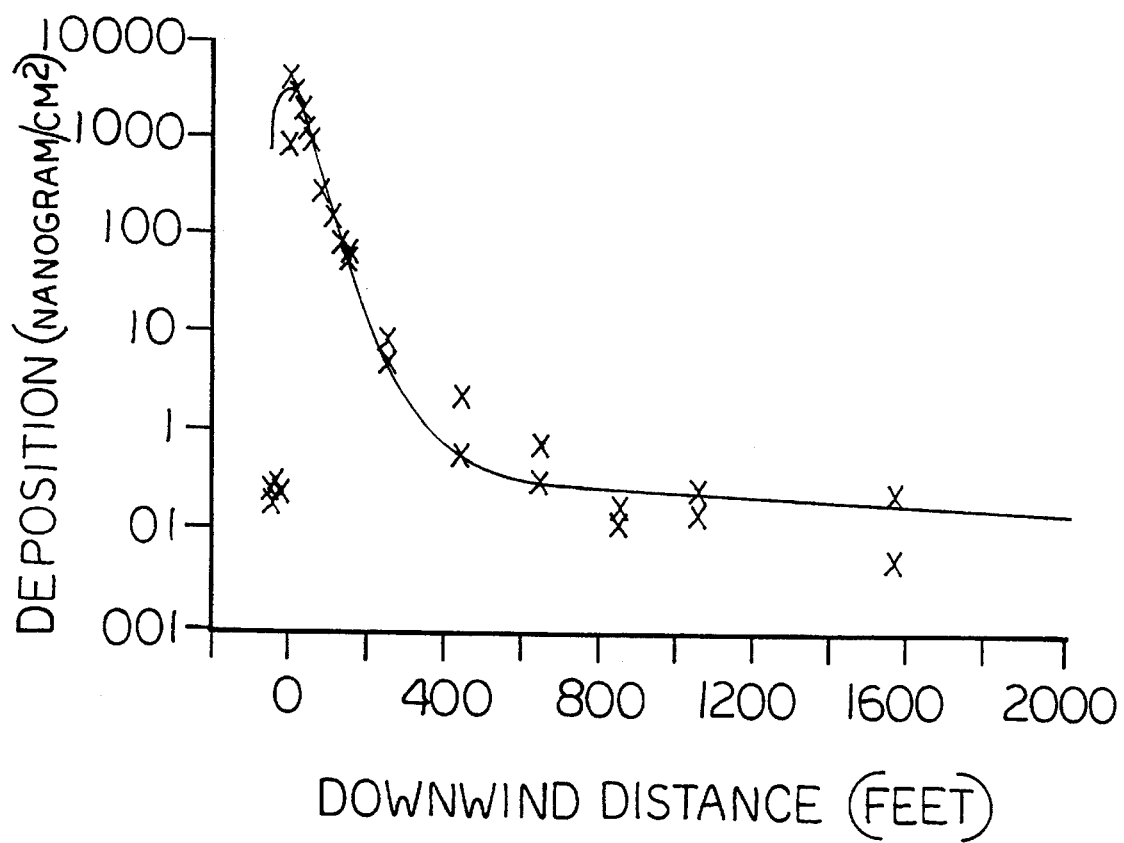
Figure 4:
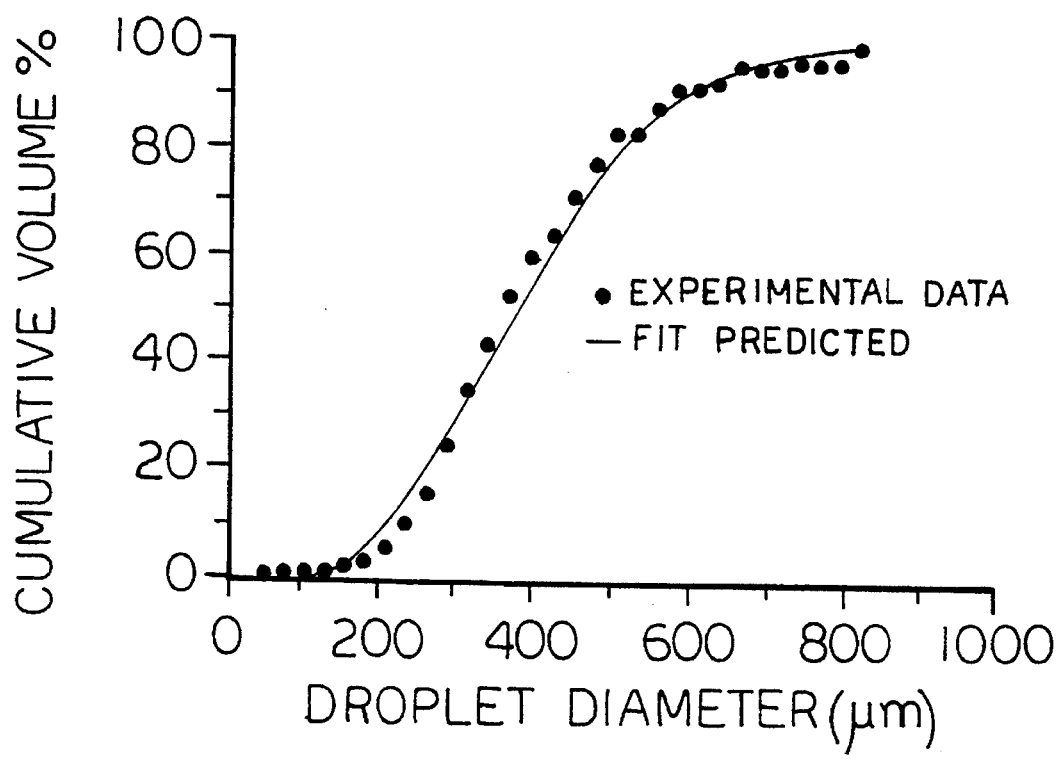
Figure 5:
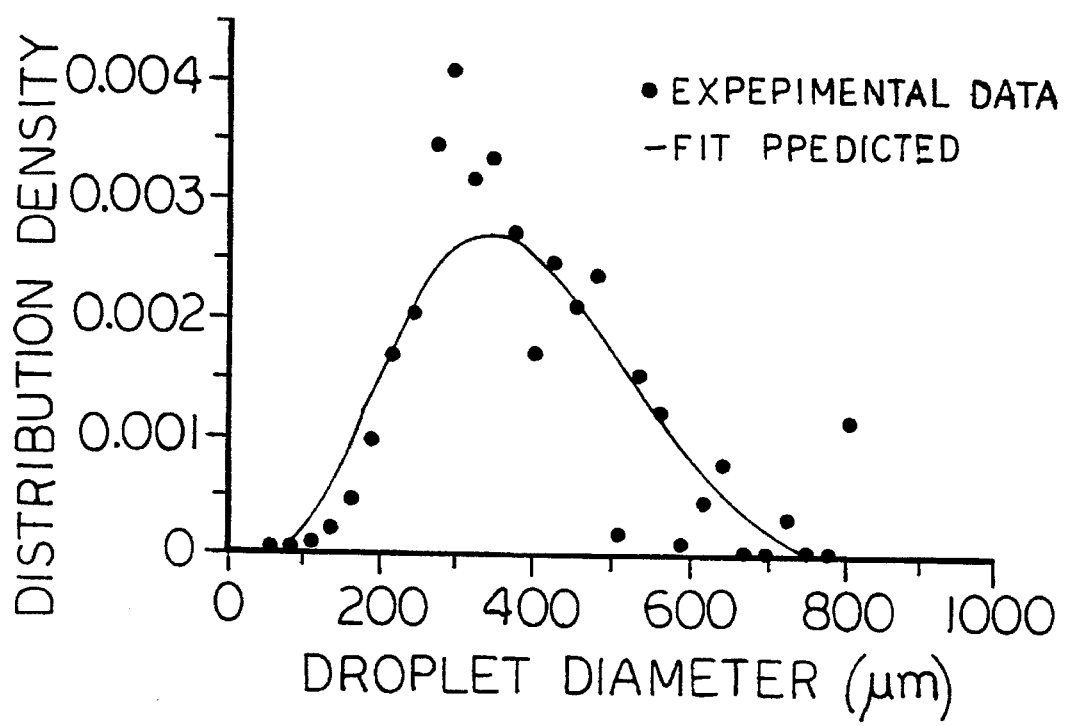
Figure 7:
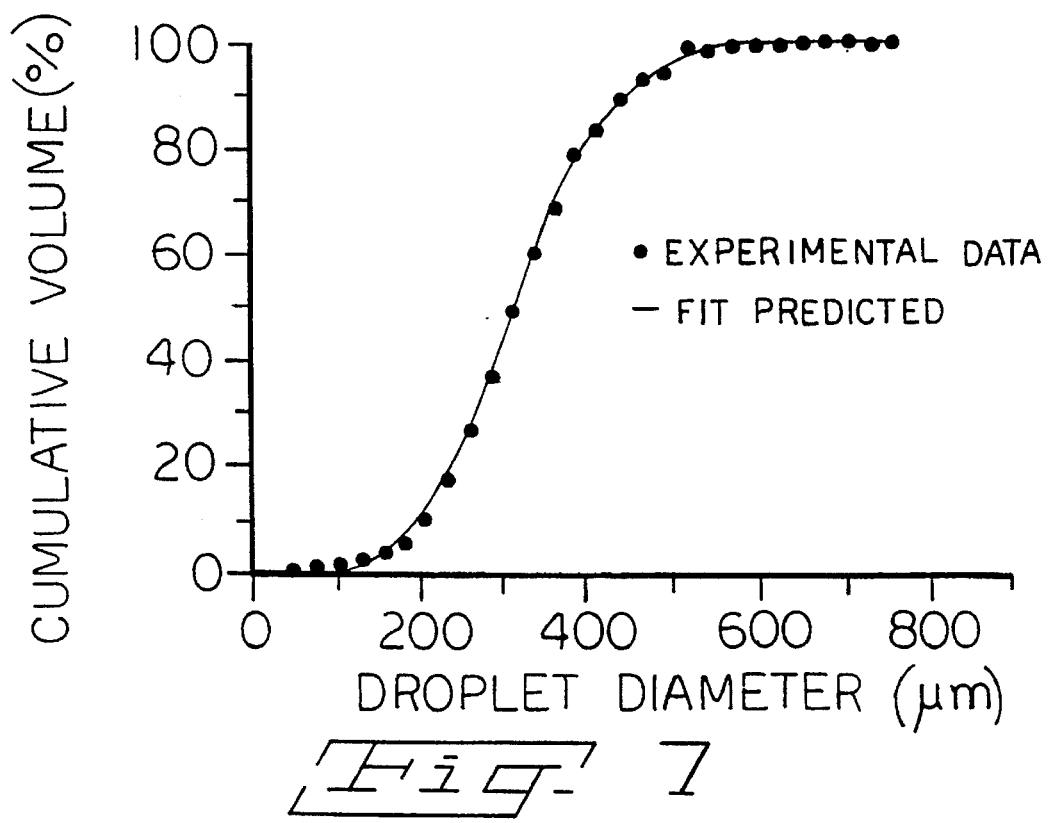
Figure 8:
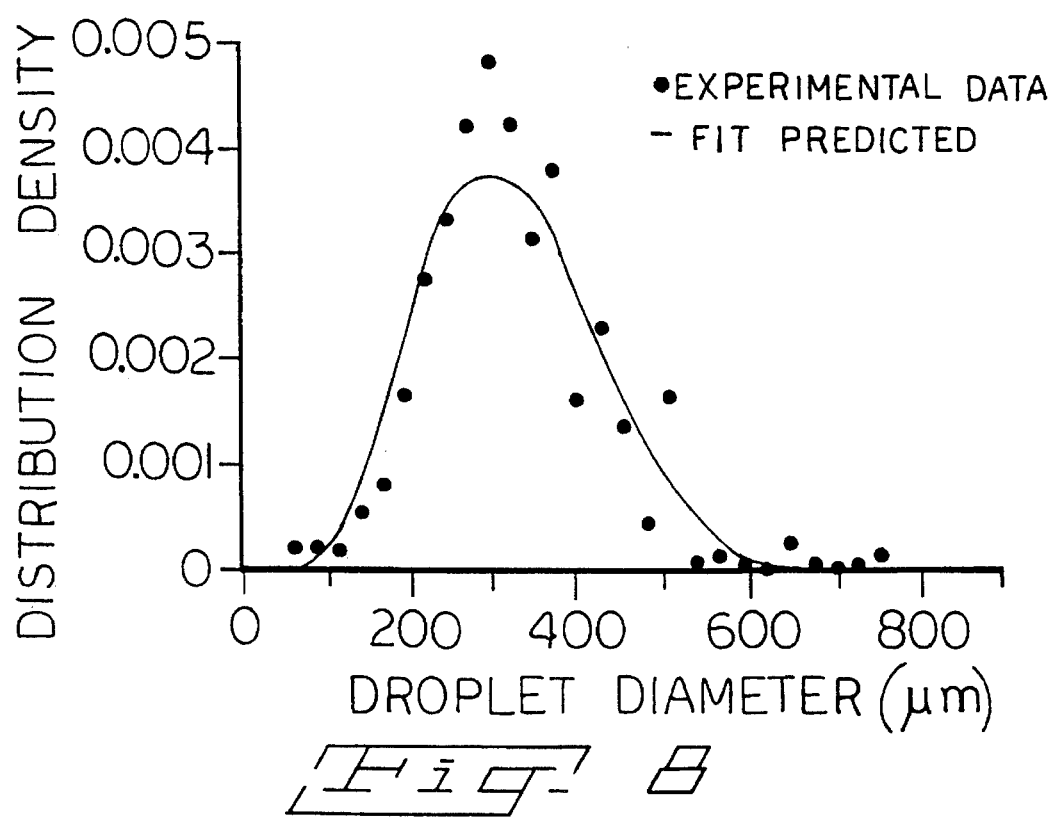
Figure 9:
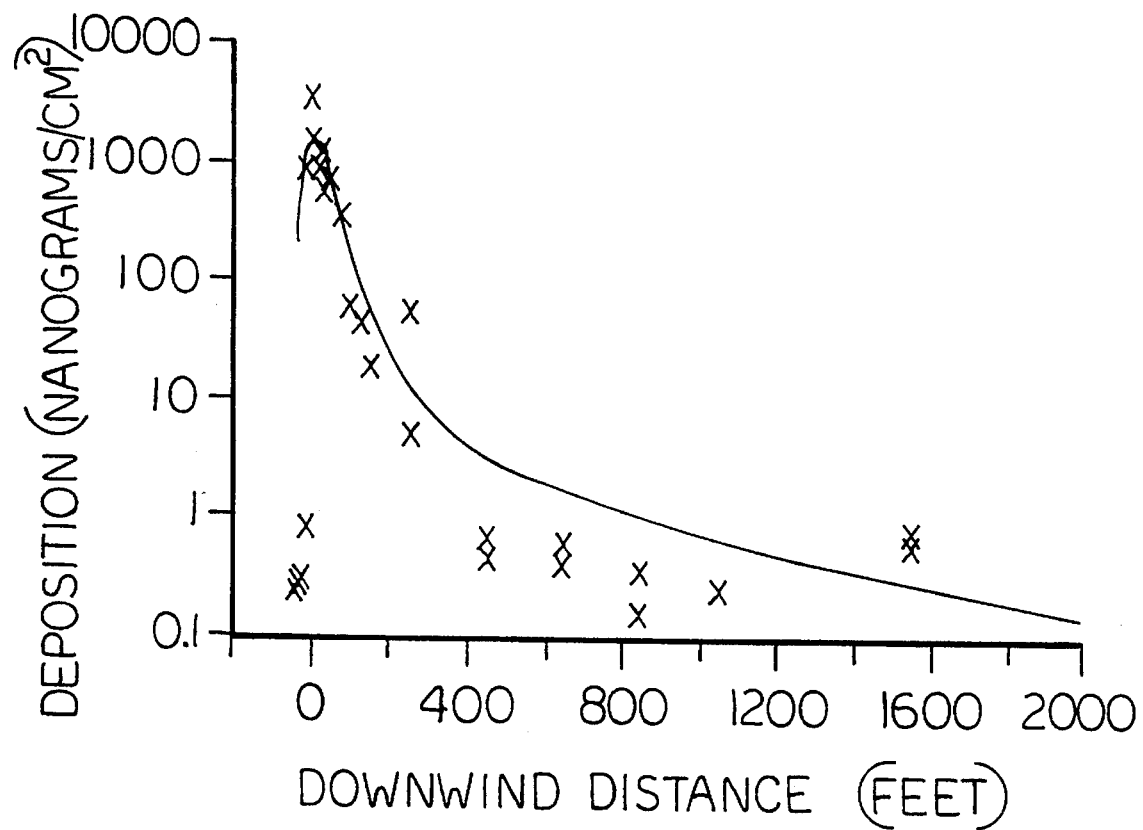

The input data for three triclopyr treatments (A–C) are summarized in Table 1, comparisons of the BLN fit of the cumulative volume data and resulting distribution densities are shown in FIGS. 1–2 (treatment A), 4–5 (treatment B) and 7–8 (treatment C) Comparisons of spray deposition predictions with actual field trial treatment data are shown in FIGS. 3 (treatment A), 6 (treatment B) and 9 (treatment C).

TABLE 1

| DowElanco Spray Deposition Model Input | Treatment | | | | | | |
|---|---|---|---|---|---|---|---|
| | A | B | C | D | E | F | G |
| Ambient Temperature (°F.) | 84.0 | 80.0 | 92.4 | 92.4 | 88.5 | 80.0 | 89.0 |
| Ambient Pressue (atm) | 1.0 | 1.0 | 1.0 | 1.0 | 1.0 | 1.0 | 1.0 |
| Relative Humidity (%) | 50.0 | 70.0 | 34.0 | 34.0 | 41.0 | 62.0 | 49.0 |
| Average Wind Velocity (mph) | 9.0 | 9.0 | 10.0 | 10.0 | 12.7 | 11.0 | 8.9 |
| Spray Volume Rate (gal/acre) | 8.70 | 5.81 | 6.08 | 30.92 | 28.02 | 28.02 | 11.22 |
| Active Ingredient (lb/gal) | 0.038 | 0.038 | 0.038 | 0.080 | 0.080 | 0.080 | 0.200 |
| Spray Specific Gravity ( ) | 1.000 | 1.000 | 1.000 | 1.000 | 1.000 | 1.000 | 1.000 |
| Volume Percent Non-Volatiles (%) | 0.9 | 2.2 | 7.9 | 4.0 | 4.0 | 4.0 | 10.0 |
| Spray Release Height (ft) | 10 | 10 | 10 | 300 | 200 | 100 | 50 |
| Number of Swaths | 1 | 1 | 1 | 1 | 1 | 1 | 1 |
| Swath Width (ft) | 50 | 50 | 50 | 50 | 50 | 50 | 50 |
| Swath Height (ft) | 10 | 10 | 10 | 50 | 50 | 40 | 30 |
| Swath Length (ft) | 1500 | 1500 | 1500 | 1500 | 1500 | 1500 | 1500 |
| Swath Displacement (ft) | 0 | 0 | 0 | 0 | 0 | 0 | 0 |

TABLE 1-continued

| DowElanco Spray Deposition | Treatment | | | | | | |
|---|---|---|---|---|---|---|---|
| Model Input | A | B | C | D | E | F | G |
| Spray Droplet Distribution | FIT | FIT | FIT | DATA | DATA | DATA | DATA |
| Distribution Parameter - Dmin (μm) | 1 | 11 | 0 | — | — | — | — |
| Distribution Parameter - Dmax (μm) | 1165 | 900 | 786 | — | — | — | — |
| Distribution Parameter - A | 1.579 | 1.451 | 1.498 | — | — | — | — |
| Distribution Parameter - δ | 1.032 | 1.019 | 1.265 | — | — | — | — |

EXAMPLE SET #2 (PREDICTED AND ACTUAL)

These right-of-way field trial treatments were for picloram herbicide formulations. Field deposition studies were performed to determine the drift potential for picloram. Spray droplet distribution measurements for the above treatments were conducted for wedge nozzles designed for operation on a thru valve boom using phase doppler particle analyzer as well as photographic image analysis techniques. Nozzle sizes ranged from 0.020–0.070 inches.

Figure 10:
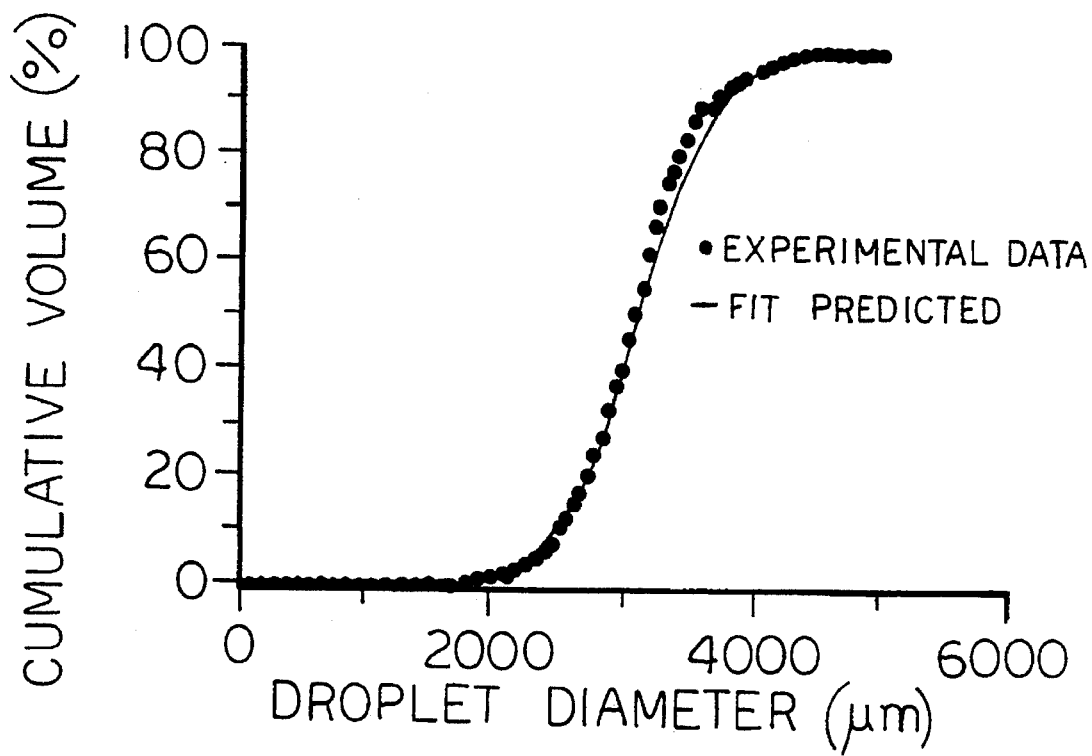
Figure 11:
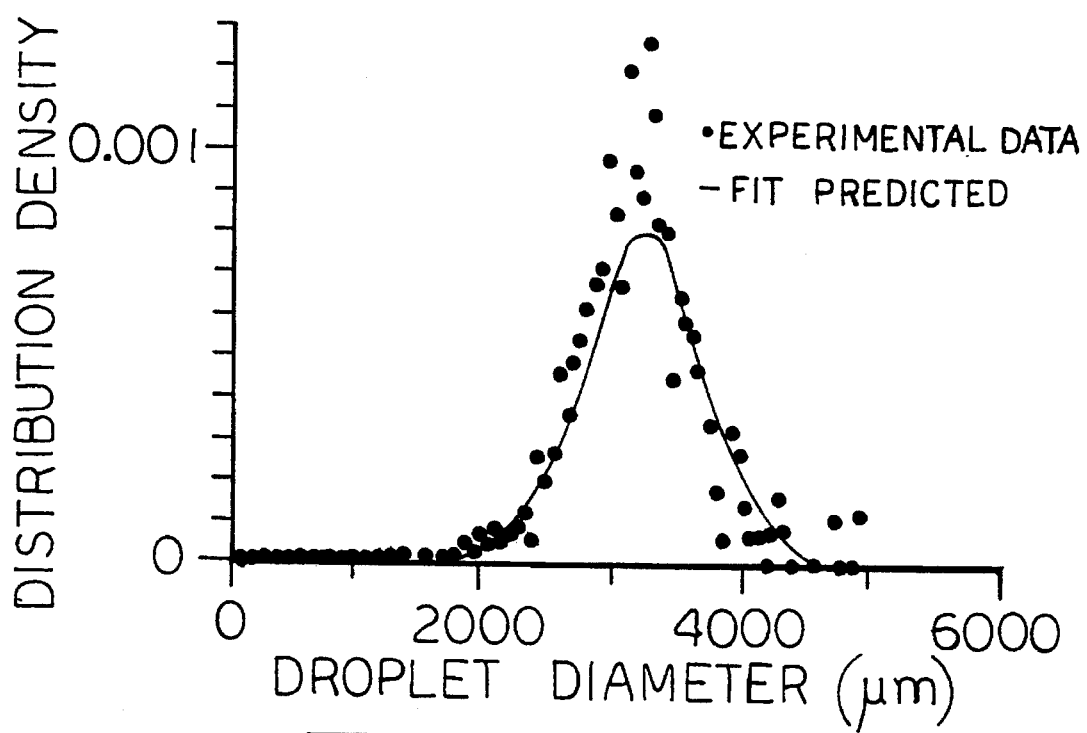
Figure 12:
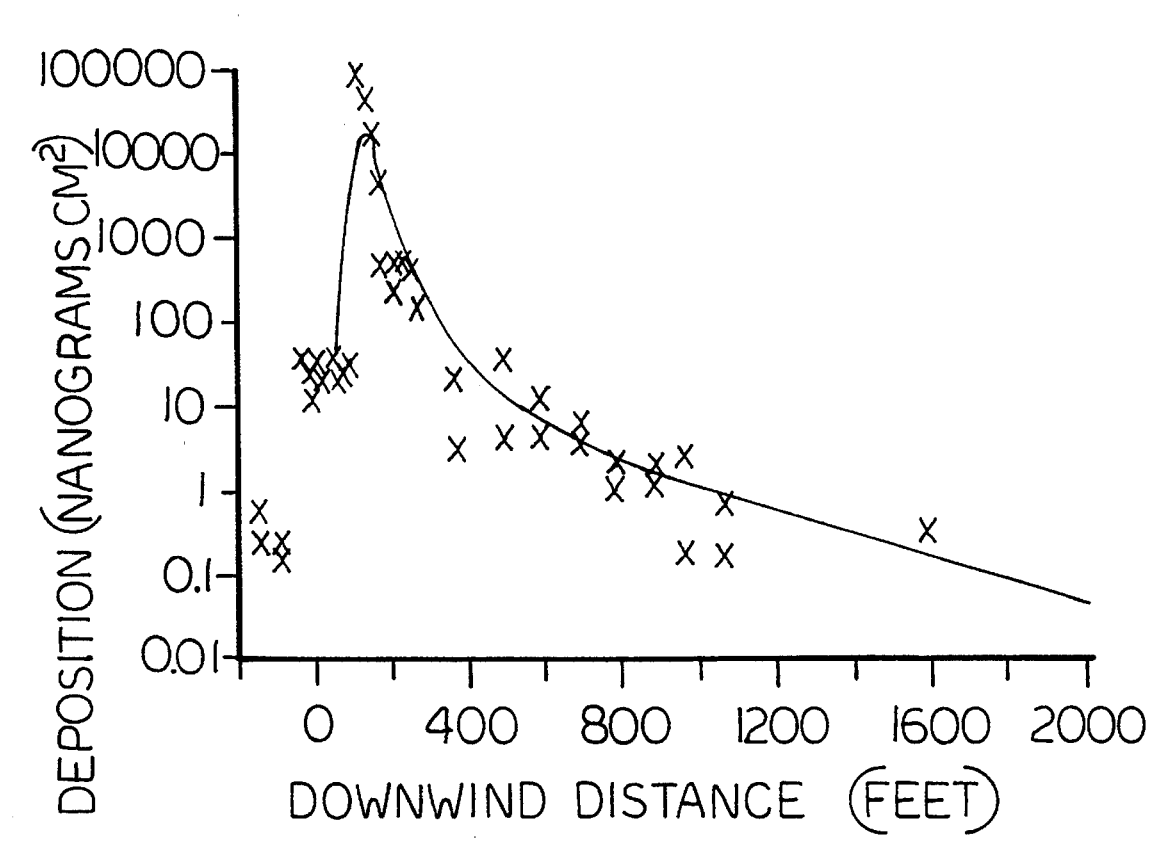
Figure 13:
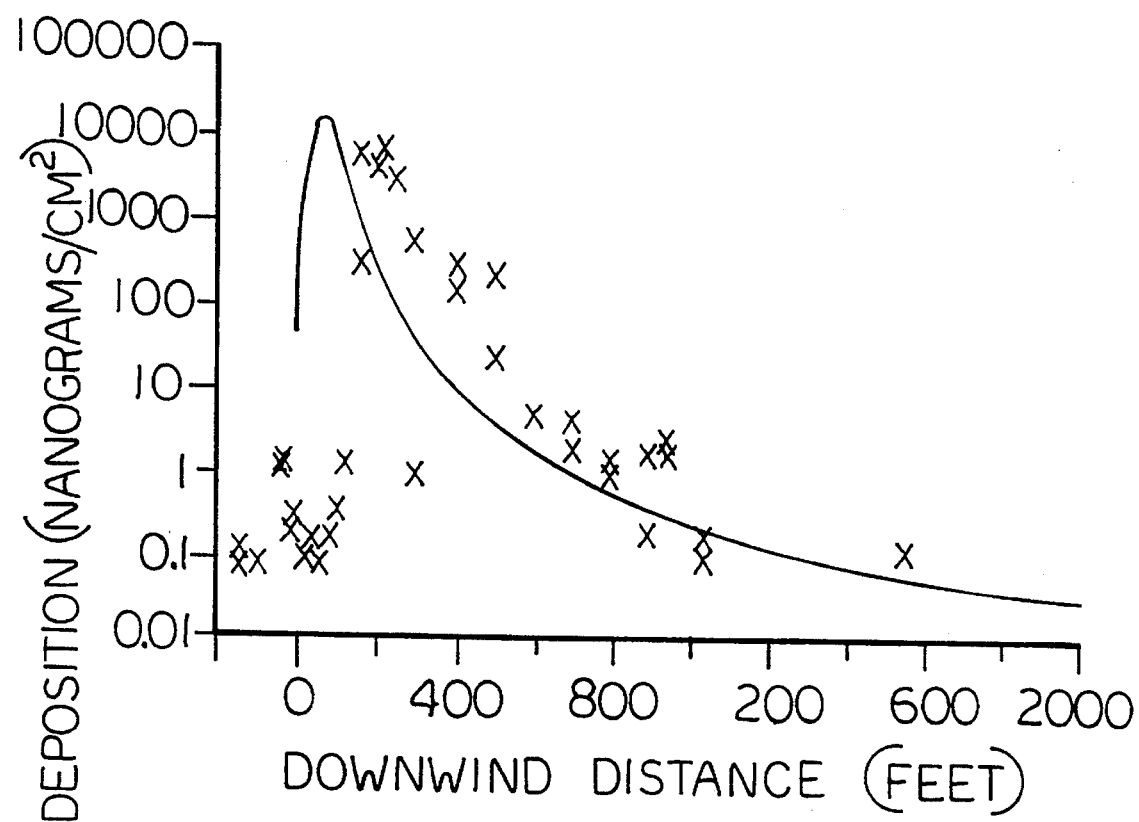
Figure 14:
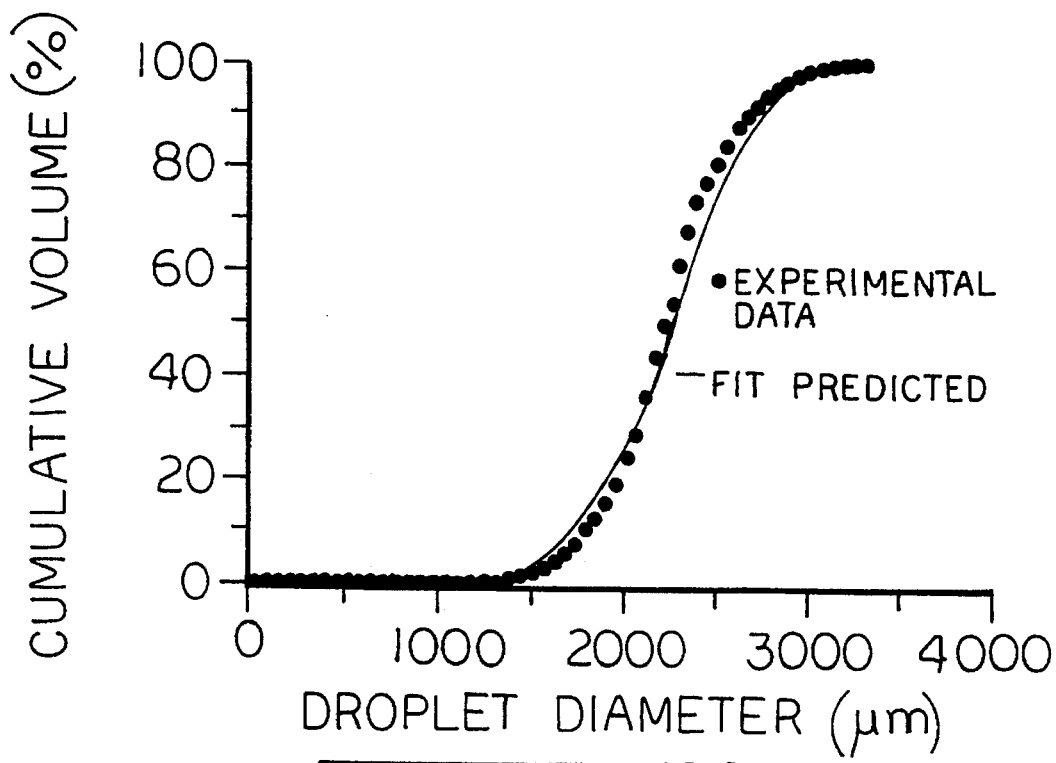
Figure 15:
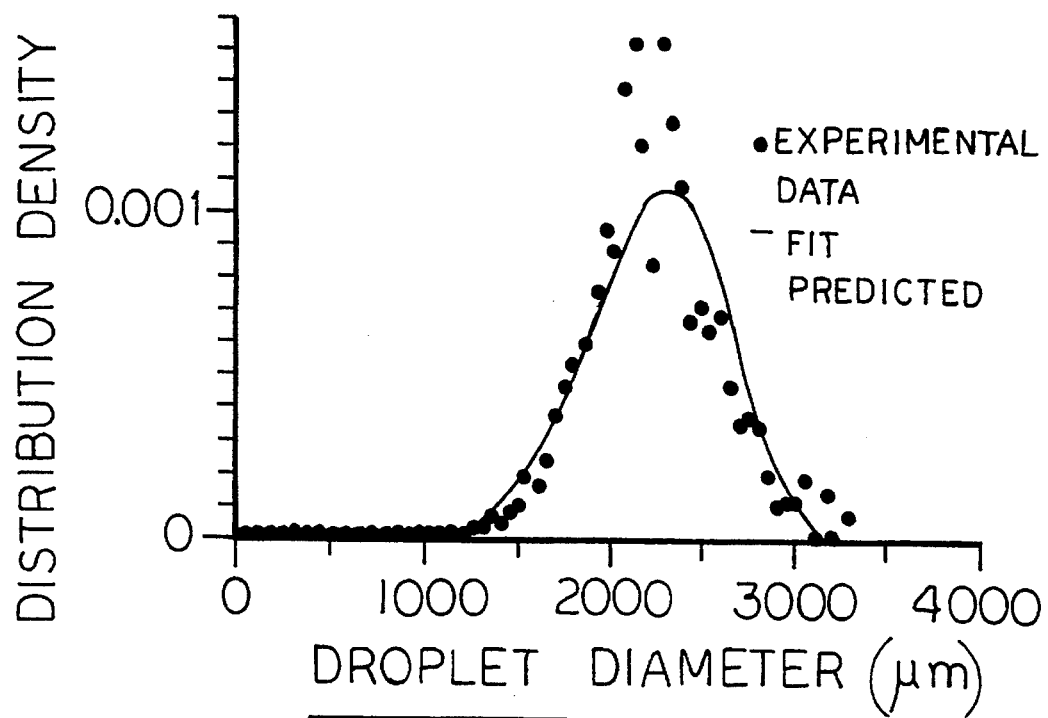
Figure 16:
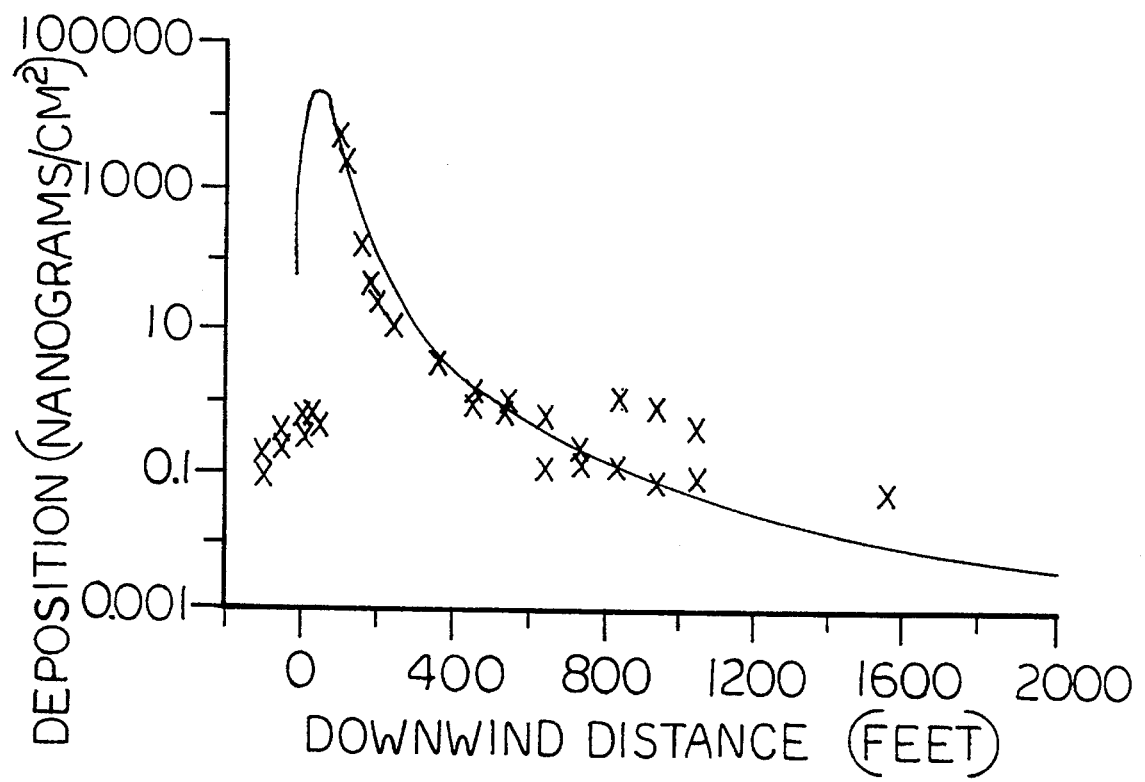
Figure 17:
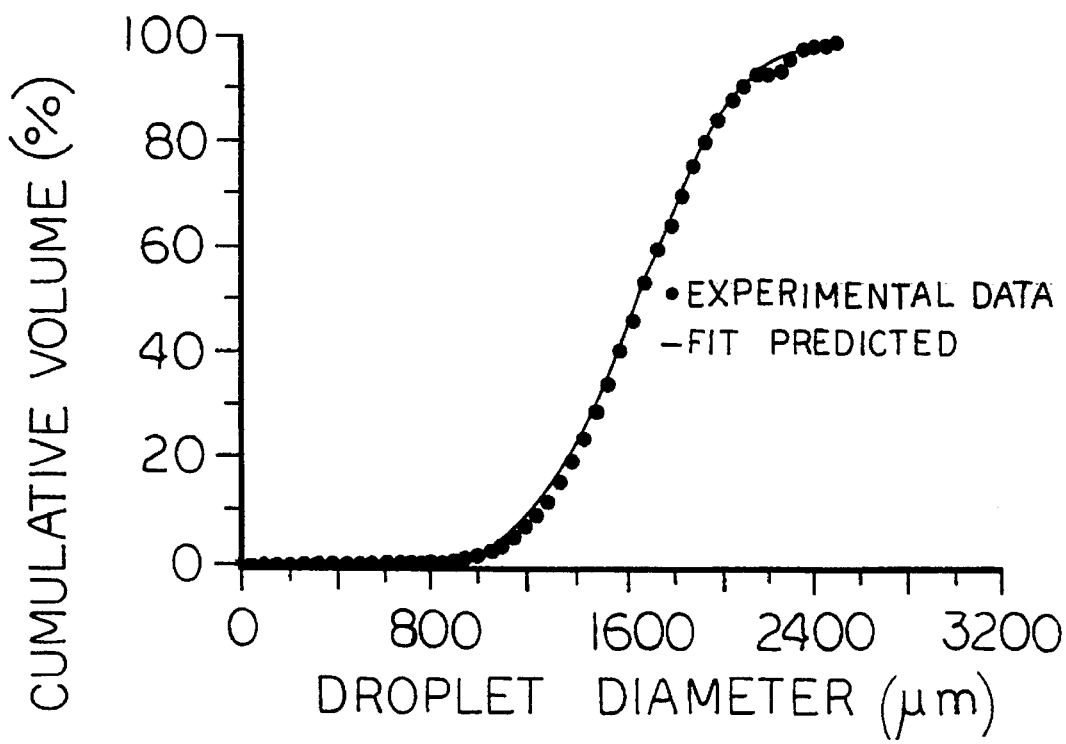
Figure 18:
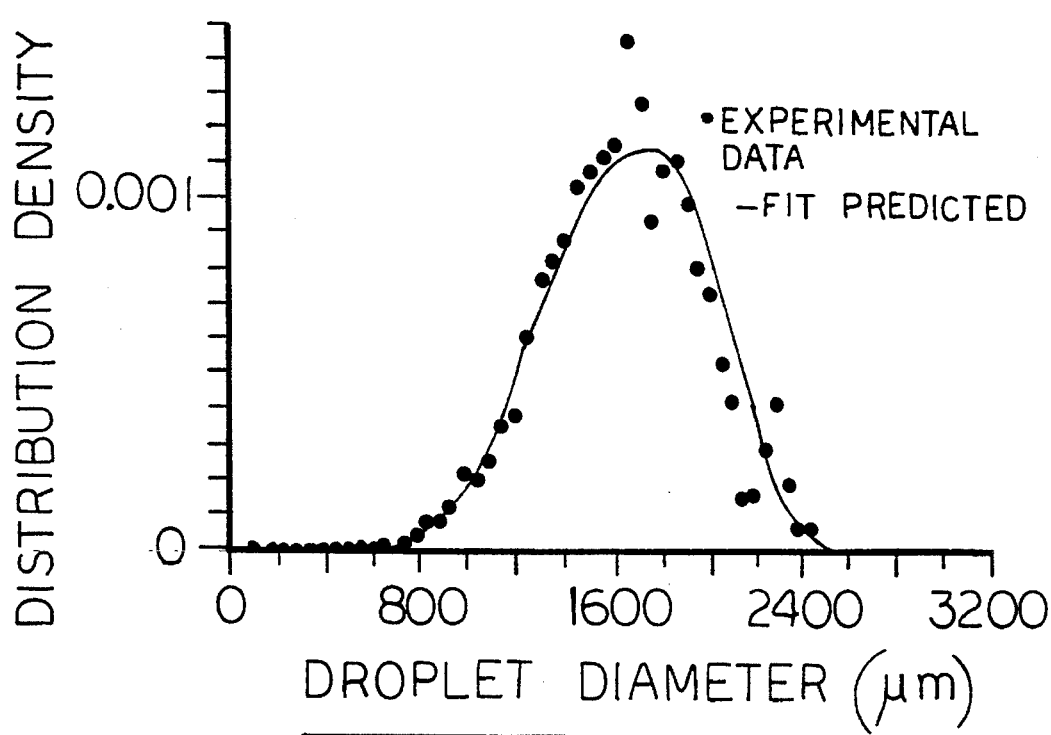
Figure 19:
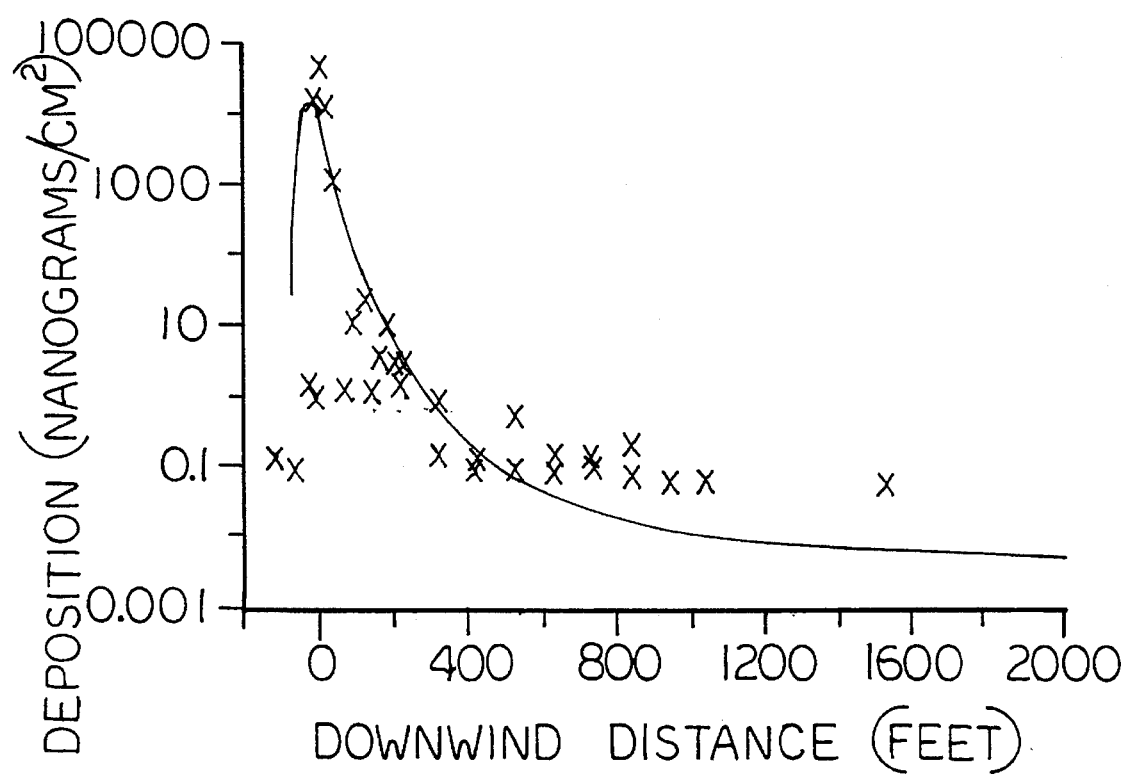

Four picloram treatments (D–G) are summarized in Table 1, comparisons of the BLN fit of the cumulative volume data and resulting distribution densities are shown in FIGS. 10–11 (treatments D–E), 14–15 (treatment F), 17–18 (treatment G) and comparisons of spray deposition predictions with field study data are shown in FIGS. 12 (treatment D), 13 (treatment E), 16 (treatment F) and 19 (treatment G).

As can be seen from FIGS. 3, 6, 9, 12, 13, 16, and 19 of both Example Sets, the predictions of the method of the present invention are consistent with actual field treatment studies for both fixed wing (agricultural—low release height) and rotary wing (right-of-way—high release height) applications.

Since this method has the capability of predicting, with reasonable accuracy, the amount of active material deposited on-target as well as off-target for both fixed-wing (low release height) and rotary-wing (high release height) applications, it could be used to establish standards for proper aerial spraying (including, but not limited to, recommended spray buffer distances).

Additionally, this method could also be used during product development to tailor pesticide formulations to improve efficacy and minimize spray drift.

This method is a balance of minimized input, speed and accuracy that captures the deposition dynamics of the complete range of spray droplet sizes. This is demonstrated by the excellent agreement between the method predictions of the present invention and the actual experimental data from field trial treatments for both the near and far field depositions under a variety of application and meteorological conditions.

FIG. 21 is a simplified schematic of the present invention showing both inputs and outputs, as well as potential additional uses for the method.

The method of the present invention, with its easy and minimized data requirements may also be used for on-site field application planning.

It is to be understood that the foregoing description is merely illustrative of preferred embodiments of the invention, of which many variations may be made by those skilled in the art within the scope of the following claims without departing from the spirit thereof.

What is claimed is:

1. A method for delivering a maximum on-target and a minimum off-target spray deposition from aerial applications comprising the steps of:
   a) providing an initial discrete spray droplet size distribution data for the applied spray formulation containing an active ingredient;
   b) providing application condition data;
   c) providing prevailing meteorological condition data;
   d) providing volume fraction data of the non-volatile components of the formulation;
   e) providing formulation carrier property data;
   f) providing fluid property data of the fluid through which the formulation carrier traverses;
   g) providing heights and widths of effective initial spray droplet volume sources which correspond to the discrete initial spray droplet sizes in the spray droplet distribution;
   h) applying the data of steps (b)-(f)—to each of the volume sources defined in step (g) to determine spray deposition resulting from each volume source comprised of droplet size distribution of step (a);
   i) combining the resulting deposition from each volume source to determine the total amount of active ingredient deposited on-target as well as off-target; and
   k) delivering the aerial application, using the results of step (i), so as to provide a maximum on-target spray deposition and a minimum off-target spray deposition.

2. The method of claim 1 wherein the application condition data are application spray rate, concentration of active material, percent non-volatiles, specific gravity, release height and swath pattern.

3. The method of claim 1 wherein the meteorological condition data are temperature, pressure, wind speed and humidity.

4. The method of claim 1 further comprising the step of determining a spray buffer distance based on the results of step (i).

5. The method of claim 1 further comprising the step of minimizing the amount of active ingredient deposited off-target based on the results of step (i).

6. The method of claim 1 further comprising the step of developing formulations containing the active ingredient to minimize the amount of active ingredient deposited off-target based on the results of step (i).

7. The method of claim 1 further comprising the step of using the results of step (i) for on-site field application planning.

* * * * *